US012021886B2

(12) United States Patent
Hirano et al.

(10) Patent No.: US 12,021,886 B2
(45) Date of Patent: Jun. 25, 2024

(54) VEHICLE LOG TRANSMISSION DEVICE, VEHICLE LOG ANALYSIS SYSTEM, AND VEHICLE LOG TRANSMISSION/RECEPTION METHOD

(71) Applicant: Panasonic Intellectual Property Corporation of America, Torrance, CA (US)

(72) Inventors: Ryo Hirano, Osaka (JP); Takeshi Kishikawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 667 days.

(21) Appl. No.: 17/222,325

(22) Filed: Apr. 5, 2021

(65) Prior Publication Data

US 2021/0226973 A1 Jul. 22, 2021

Related U.S. Application Data

(63) Continuation of application No. PCT/JP2019/035421, filed on Sep. 9, 2019.

(30) Foreign Application Priority Data

Nov. 30, 2018 (JP) ................................ 2018-224508

(51) Int. Cl.
*H04L 12/40* (2006.01)
*G07C 5/00* (2006.01)
(Continued)

(52) U.S. Cl.
CPC .......... *H04L 63/1425* (2013.01); *G07C 5/008* (2013.01); *G07C 5/0808* (2013.01);
(Continued)

(58) Field of Classification Search
None
See application file for complete search history.

(56) References Cited

U.S. PATENT DOCUMENTS

2003/0138041 A1 7/2003 Moore et al.
2011/0173604 A1 7/2011 Nakamura et al.
(Continued)

FOREIGN PATENT DOCUMENTS

| CN | 107613527 | 1/2018 |
| JP | 5342302 | 11/2013 |
| JP | 2014-146868 | 8/2014 |

OTHER PUBLICATIONS

Dec. 23, 2021 European Search Report for corresponding European patent application No. 19891624.9.
(Continued)

*Primary Examiner* — Craig C Dorais
(74) *Attorney, Agent, or Firm* — Greenblum & Bernstein, P.L.C.

(57) ABSTRACT

A vehicle log transmission device includes: a vehicle log obtainer that obtains the vehicle log; a vehicle state extractor that extracts a vehicle state from the obtained vehicle log; difference generation log storage that stores a list of difference generation logs, each being a vehicle log for each of vehicle states shared between the vehicle log transmission device and a vehicle log analysis server; a difference generation log selector that selects a difference generation log from the list in accordance with the extracted vehicle state; a difference log generator that generates a difference log based on the obtained vehicle log and the selected difference generation log; and a difference log transmitter that transmits, to the vehicle log analysis server, the generated difference log and a difference generation log identifier corresponding to the selected difference generation log.

21 Claims, 14 Drawing Sheets

(51) Int. Cl.
*G07C 5/08* (2006.01)
*H04L 9/40* (2022.01)

(52) U.S. Cl.
CPC ...... *G07C 5/0816* (2013.01); *H04L 12/40169* (2013.01); *H04L 2012/40215* (2013.01); *H04L 2012/40273* (2013.01)

(56) References Cited

U.S. PATENT DOCUMENTS

| | | | |
|---|---|---|---|
| 2014/0379205 A1* | 12/2014 | Muetzel | G07C 5/08 |
| | | | 701/32.4 |
| 2015/0358351 A1 | 12/2015 | Otsuka et al. | |
| 2018/0295147 A1* | 10/2018 | Haga | H04L 67/12 |
| 2020/0378765 A1* | 12/2020 | Zhang | G07C 5/008 |

OTHER PUBLICATIONS

Percival, "Binary diff/patch utility", http://www.daemonology.net/bsdiff/, Nov. 6, 2018.

Official Communication issued in International Patent Application No. PCT/JP2019/035421, dated Nov. 26, 2019, along with an English translation thereof.

* cited by examiner

FIG. 4

| TIME | ID | DATA (HEXADECIMAL FORMAT) | | | | | | | |
|---|---|---|---|---|---|---|---|---|---|
| | | 1ST BYTE | 2ND BYTE | 3RD BYTE | 4TH BYTE | 5TH BYTE | 6TH BYTE | 7TH BYTE | 8TH BYTE |
| 10:10:10 | ID1 | 01 | 50 | 40 | 30 | 30 | 30 | 30 | 30 |
| 10:10:20 | ID2 | 01 | A1 | 20 | 00 | 01 | 00 | 00 | 00 |
| 10:10:30 | ID3 | 01 | B1 | 7E | 20 | 00 | 00 | 00 | 00 |
| 10:10:40 | ID4 | 01 | 01 | 10 | 10 | 00 | 00 | 00 | 00 |
| 10:20:10 | ID1 | 02 | 50 | 40 | 30 | 30 | 30 | 30 | 30 |
| 10:20:20 | ID2 | 02 | A2 | 20 | 00 | 01 | 00 | 00 | 00 |
| 10:20:30 | ID3 | 02 | B2 | 7E | 30 | 00 | 00 | 00 | 00 |
| 10:20:40 | ID4 | 02 | 01 | 10 | 11 | 00 | 00 | 00 | 00 |
| ⋮ | ⋮ | ⋮ | ⋮ | ⋮ | ⋮ | ⋮ | ⋮ | ⋮ | ⋮ |
| 10:50:10 | ID1 | 05 | 50 | 40 | 30 | 30 | 30 | 30 | 30 |
| 10:50:20 | ID2 | 05 | A5 | 20 | 10 | 01 | 00 | 00 | 00 |
| 10:50:30 | ID3 | 05 | B5 | 7E | 10 | 00 | 00 | 00 | 00 |
| 10:50:40 | ID4 | 05 | 01 | 10 | 15 | 00 | 00 | 00 | 00 |

FIG. 5

| ID | DATA | | | | | | | |
|---|---|---|---|---|---|---|---|---|
| | 1ST BYTE | 2ND BYTE | 3RD BYTE | 4TH BYTE | 5TH BYTE | 6TH BYTE | 7TH BYTE | 8TH BYTE |
| ID1 | COUNTER | VEHICLE NO. | VEHICLE NO. | VEHICLE NO. | VEHICLE NO. | VEHICLE NO. | VEHICLE NO. | VEHICLE NO. |
| ID2 | COUNTER | CHECKSUM | SPEED | SPEED | SHIFT | UNUSED | UNUSED | UNUSED |
| ID3 | COUNTER | CHECKSUM | STEERING ANGLE | STEERING ANGLE | UNUSED | UNUSED | UNUSED | UNUSED |
| ID4 | COUNTER | VEHICLE STATE | LOCATION INFORMATION | LOCATION INFORMATION | WIPERS | AIR CONDITIONER | UNUSED | UNUSED |

VEHICLE NO.: 7 BYTES: FIXED VALUE FOR EACH VEHICLE
SPEED: 2 BYTES: FROM 0000 TO FFFF
STEERING ANGLE: 2 BYTES: FROM 0000 TO FFFF
LOCATION INFORMATION: 2 BYTES: FROM 0000 TO FFFF
SHIFT: 00: PARKING; 01: DRIVE
CHECKSUM: FROM 00 TO FF
COUNTER: FROM 00 TO FF
VEHICLE STATE: 00: STOPPED; 01: CRUISE CONTROL MODE: 02: JAPAN, OSAKA PREF., OSAKA CITY; 03: RAIN, 20 DEG.
WIPERS: 00: NOT RUNNING; 01: RUNNING
AIR CONDITIONER: 00: NOT RUNNING; 01: RUNNING

FIG. 6

| PROCESSING ITEM | PROCESSING Y/N | VALUE BEFORE PROCESSING | VALUE AFTER PROCESSING |
|---|---|---|---|
| TIME INDEX | YES | ID1 INITIAL TIME (10:10:10) | T11 |
| | | ID2 INITIAL TIME (10:10:20) | T12 |
| | | ID3 INITIAL TIME (10:10:30) | T13 |
| | | ID4 INITIAL TIME (10:10:40) | T14 |
| | | ID1 SECOND TIME (10:20:10) | T21 |
| | | ID2 SECOND TIME (10:20:20) | T22 |
| | | ID3 SECOND TIME (10:20:30) | T23 |
| | | ID4 SECOND TIME (10:20:40) | T24 |
| | | ... | ... |
| | | ID1 FIFTH TIME (10:50:10) | T51 |
| | | ID2 FIFTH TIME (10:50:20) | T52 |
| | | ID3 FIFTH TIME (10:50:30) | T53 |
| | | ID4 FIFTH TIME (10:50:40) | T54 |
| ID SORTING (ASC. ORDER) | YES | - | - |
| DATA SORTING (ASC. ORDER) | YES | - | - |
| DATA REPLACEMENT | YES | COUNTER | 00 |
| | | CHECKSUM | 00 |

FIG. 7

| TIME | ID | DATA (HEXADECIMAL FORMAT) | | | | | | | |
|---|---|---|---|---|---|---|---|---|---|
| | | 1ST BYTE | 2ND BYTE | 3RD BYTE | 4TH BYTE | 5TH BYTE | 6TH BYTE | 7TH BYTE | 8TH BYTE |
| T11 | ID1 | 00 | 50 | 40 | 30 | 30 | 30 | 30 | 30 |
| T21 | ID1 | 00 | 50 | 40 | 30 | 30 | 30 | 30 | 30 |
| ⋮ | ⋮ | ⋮ | ⋮ | ⋮ | ⋮ | ⋮ | ⋮ | ⋮ | ⋮ |
| T51 | ID1 | 00 | 50 | 40 | 30 | 30 | 30 | 30 | 30 |
| T12 | ID2 | 00 | 00 | 20 | 00 | 01 | 00 | 00 | 00 |
| T22 | ID2 | 00 | 00 | 20 | 00 | 01 | 00 | 00 | 00 |
| ⋮ | ⋮ | ⋮ | ⋮ | ⋮ | ⋮ | ⋮ | ⋮ | ⋮ | ⋮ |
| T52 | ID2 | 00 | 00 | 20 | 10 | 01 | 00 | 00 | 00 |
| T53 | ID3 | 00 | 00 | 7E | 10 | 00 | 00 | 00 | 00 |
| T13 | ID3 | 00 | 00 | 7E | 20 | 00 | 00 | 00 | 00 |
| ⋮ | ⋮ | ⋮ | ⋮ | ⋮ | ⋮ | ⋮ | ⋮ | ⋮ | ⋮ |
| T23 | ID3 | 00 | 00 | 7E | 30 | 00 | 00 | 00 | 00 |
| T14 | ID4 | 00 | 01 | 10 | 10 | 00 | 00 | 00 | 00 |
| T24 | ID4 | 00 | 01 | 10 | 11 | 00 | 00 | 00 | 00 |
| ⋮ | ⋮ | ⋮ | ⋮ | ⋮ | ⋮ | ⋮ | ⋮ | ⋮ | ⋮ |
| T54 | ID4 | 00 | 01 | 10 | 15 | 00 | 00 | 00 | 00 |

FIG. 8

| No. | VEHICLE STATE | ID | DATA (HEXADECIMAL FORMAT) | | | | | | | |
|---|---|---|---|---|---|---|---|---|---|---|
| | | | 1ST BYTE | 2ND BYTE | 3RD BYTE | 4TH BYTE | 5TH BYTE | 6TH BYTE | 7TH BYTE | 8TH BYTE |
| 1 | STOPPED | ID1 | 00 | 50 | 40 | 30 | 30 | 30 | 30 | 30 |
| | | ID2 | 00 | 00 | 00 | 00 | 00 | 00 | 00 | 00 |
| | | ID3 | 00 | 00 | 7E | 00 | 00 | 00 | 00 | 00 |
| | | ID4 | 00 | 00 | 00 | 00 | 00 | 00 | 00 | 00 |
| 2 | CRUISE CONTROL MODE | ID1 | 00 | 50 | 40 | 30 | 30 | 30 | 30 | 30 |
| | | ID2 | 00 | 00 | 20 | 10 | 01 | 00 | 00 | 00 |
| | | ID3 | 00 | 00 | 7E | 00 | 00 | 00 | 00 | 00 |
| | | ID4 | 00 | 01 | 00 | 00 | 00 | 00 | 00 | 00 |
| 3 | JAPAN, OSAKA PREF., OSAKA CITY | ID1 | 00 | 50 | 40 | 30 | 30 | 30 | 30 | 30 |
| | | ID2 | 00 | 00 | 10 | 00 | 00 | 00 | 00 | 00 |
| | | ID3 | 00 | 00 | 7E | 00 | 00 | 00 | 00 | 00 |
| | | ID4 | 00 | 02 | 87 | 34 | 00 | 00 | 00 | 00 |
| 4 | RAIN, 20 DEG. | ID1 | 00 | 50 | 40 | 30 | 30 | 30 | 30 | 30 |
| | | ID2 | 00 | 00 | 10 | 00 | 00 | 00 | 00 | 00 |
| | | ID3 | 00 | 00 | 7E | 00 | 00 | 00 | 00 | 00 |
| | | ID4 | 00 | 03 | 00 | 00 | 01 | 00 | 00 | 00 |

FIG. 9

| TIME | ID | DATA (HEXADECIMAL FORMAT) | | | | | | | |
|---|---|---|---|---|---|---|---|---|---|
| | | 1ST BYTE | 2ND BYTE | 3RD BYTE | 4TH BYTE | 5TH BYTE | 6TH BYTE | 7TH BYTE | 8TH BYTE |
| T11 | ID1 | 00 | 00 | 00 | 00 | 00 | 00 | 00 | 00 |
| T21 | ID1 | 00 | 00 | 00 | 00 | 00 | 00 | 00 | 00 |
| : | : | : | : | : | : | : | : | : | : |
| T51 | ID1 | 00 | 00 | 00 | 00 | 00 | 00 | 00 | 00 |
| T12 | ID2 | 00 | 00 | 00 | 10 | 00 | 00 | 00 | 00 |
| T22 | ID2 | 00 | 00 | 00 | 10 | 00 | 00 | 00 | 00 |
| : | : | : | : | : | : | : | : | : | : |
| T52 | ID2 | 00 | 00 | 00 | 20 | 00 | 00 | 00 | 00 |
| T53 | ID3 | 00 | 00 | 00 | 10 | 00 | 00 | 00 | 00 |
| T23 | ID3 | 00 | 00 | 00 | 20 | 00 | 00 | 00 | 00 |
| : | : | : | : | : | : | : | : | : | : |
| T13 | ID3 | 00 | 00 | 00 | 30 | 00 | 00 | 00 | 00 |
| T14 | ID4 | 00 | 00 | 10 | 10 | 00 | 00 | 00 | 00 |
| T24 | | 00 | 00 | 10 | 11 | 00 | 00 | 00 | 00 |
| : | : | : | : | : | : | : | : | : | : |
| T54 | ID4 | 00 | 00 | 10 | 15 | 00 | 00 | 00 | 00 |

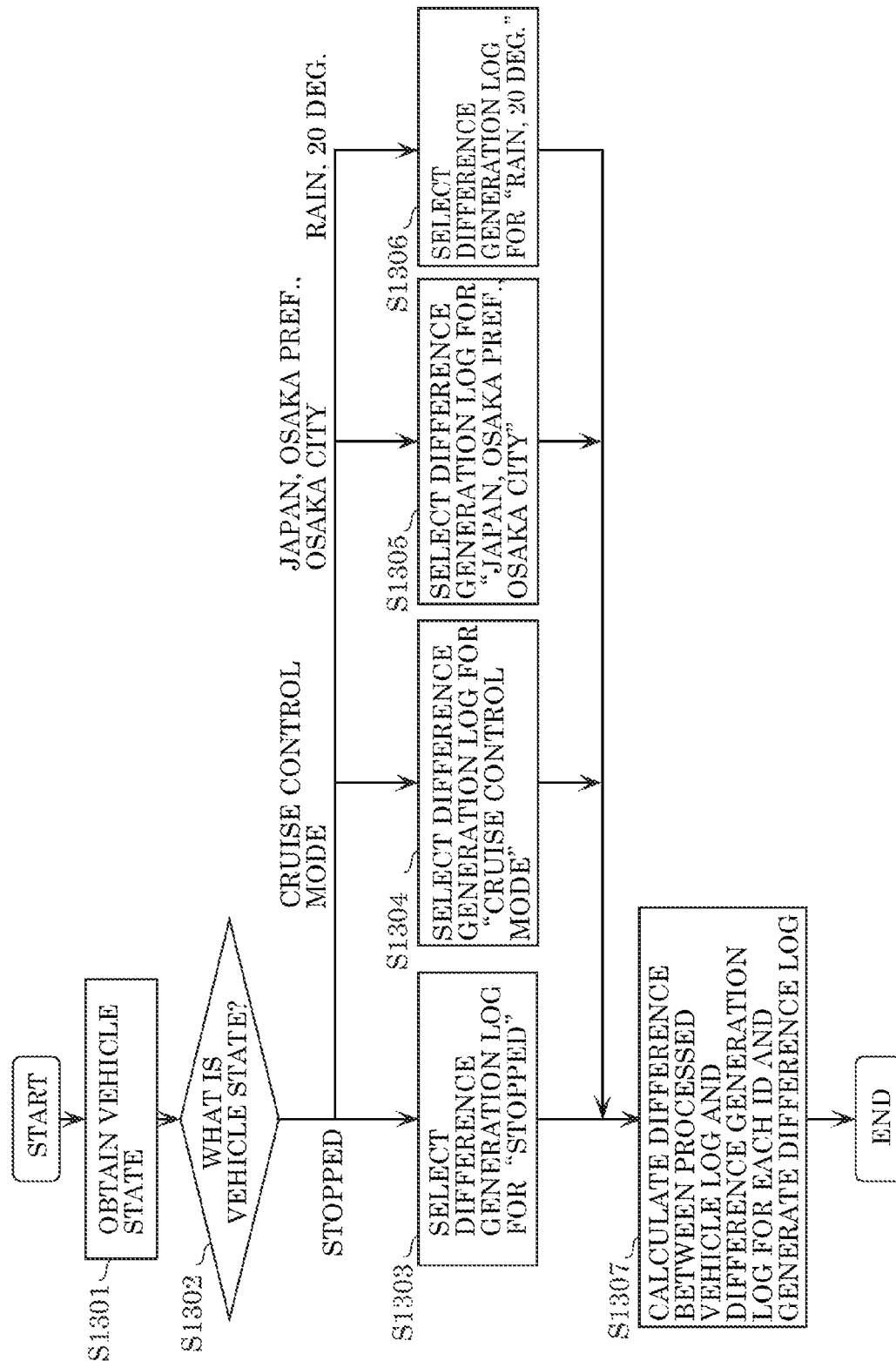

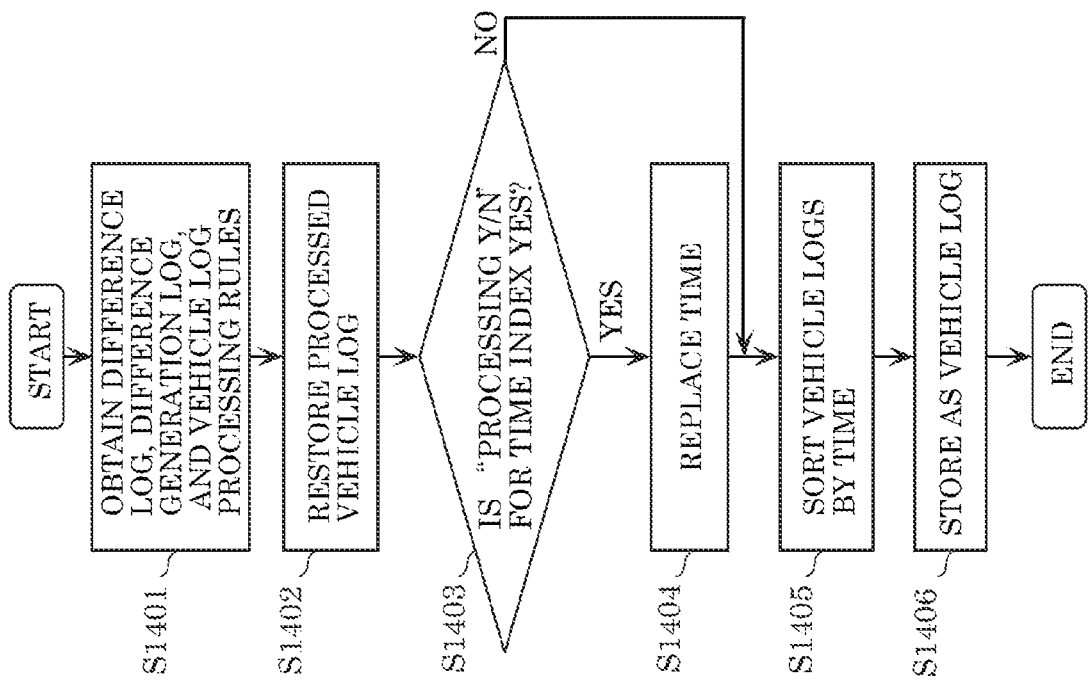

VEHICLE LOG TRANSMISSION DEVICE, VEHICLE LOG ANALYSIS SYSTEM, AND VEHICLE LOG TRANSMISSION/RECEPTION METHOD

CROSS REFERENCE TO RELATED APPLICATIONS

This application is a U.S. continuation application of PCT International Patent Application Number PCT/JP2019/035421 filed on Sep. 9, 2019, claiming the benefit of priority of Japanese Patent Application Number 2018-224508 filed on Nov. 30, 2018, the entire contents of which are hereby incorporated by reference.

BACKGROUND

1. Technical Field

The present disclosure relates to a vehicle log transmission device, a vehicle log analysis system, and a vehicle log transmission/reception method.

2. Description of the Related Art

Recently, many devices called Electronic Control Units (ECUs) are being provided in systems installed in automobiles. A network which connects these ECUs is called an "in-vehicle network". There are many in-vehicle network standards. The standard known as CAN (Controller Area Network), defined by ISO 11898-1, is the most mainstream standard for in-vehicle networks.

In a CAN, a communication path is constituted by two buses, and ECUs connected to the buses are called "nodes". Each node connected to a bus transmits and receives messages called "frames". CAN does not have identifiers indicating transmission destination nodes or transmission source nodes. Instead, a transmitting node adds an ID called a "message ID" to each frame before transmitting the frame, and each receiving node receives only frames which have a predetermined message ID.

As such, there is a threat in that the unauthorized control of an automobile can be achieved by connecting an ECU to a CAN bus and transmitting frames including anomalous control commands by impersonating a legitimate ECU.

In light of this threat, the method disclosed in Japanese Unexamined Patent Application Publication No. 2014-146868 (Patent Literature 1 (PTL 1)) can be given as an example of a method for detecting unauthorized data, i.e., the infiltration of anomalous control commands, in an in-vehicle network.

However, when a server system outside a vehicle monitors data in an in-vehicle network system, a large amount of data may be transmitted from the in-vehicle network system to the external server system. It is not easy to prepare the resources required to process such a large amount of data.

Japanese Patent No. 5342302 (Patent Literature 2 (PTL 2)) discloses a method that reduces the amount of data communicated by dividing a large amount of data into pieces of data of a predetermined size, comparing each instance of the divided data with data stored in a server, and when the data matches, only a hash value of the divided data is transmitted, whereas when the data does not match, the divided data is transmitted to the server.

Additionally, the method described in Colin Percival, "Binary diff/patch utility" (retrieved Nov. 6, 2018, from http://www.daemonology.net/bsdiff/) (Non Patent Literature 1 (NPL 1)) can be given as a method for calculating a difference between two types of data. Generally, when there is only a small difference, the difference data skews toward 0, which provides a high data compression rate when applying a compression algorithm such as LHA or Zip to the difference data, and makes it possible to efficiently reduce the amount of data communicated.

SUMMARY

However, in-vehicle network logs include data which fluctuates depending on the state of the automobile, as well as time data, and thus with the method of dividing the data into a predetermined size described in the related art, the divided data in a log currently obtained has a low degree of similarity with divided data in logs obtained in the past and stored in the server. This results in an increased difference between the divided data in the log currently obtained and the divided data in logs obtained in the past and stored in the server, which in turn reduces the compression rate of the difference data and makes it necessary to transmit a greater amount of data to the server. There is thus a problem in that the amount of data communicated cannot be efficiently reduced as compared to a case where the logs are transmitted in an undivided state.

Accordingly, the present disclosure provides a vehicle log transmission device and the like capable of effectively reducing an amount of data communicated for a vehicle log transmitted from a vehicle to a server outside the vehicle.

To solve the above-described problem, a vehicle log transmission device according to the present disclosure is a vehicle log transmission device that transmits a vehicle log to a vehicle log analysis server, the vehicle log transmission device including: a vehicle log obtainer that obtains the vehicle log; a vehicle state extractor that extracts a vehicle state from the obtained vehicle log; difference generation log storage that stores a list of difference generation logs, each difference generation log being a vehicle log for each of vehicle states shared between the vehicle log transmission device and the vehicle log analysis server; a difference generation log selector that selects a difference generation log from the list in accordance with the extracted vehicle state; a difference log generator that generates a difference log based on the obtained vehicle log and the selected difference generation log; and a difference log transmitter that transmits, to the vehicle log analysis server, the generated difference log and a difference generation log identifier corresponding to the selected difference generation log.

Note that these comprehensive or specific aspects may be realized by a system, a method, an integrated circuit, a computer program, or a computer-readable recording medium such as a CD-ROM, or may be implemented by any desired combination of systems, devices, methods, integrated circuits, computer programs, and recording media.

A vehicle log transmission device and the like according to an aspect of the present disclosure can effectively reduce an amount of data communicated for a vehicle log transmitted between a vehicle and a server outside the vehicle. As a result, a vehicle log can be transmitted to an external server without preparing resources which enable large vehicle logs to be communicated. This makes it possible to detect the unauthorized data infiltrating the vehicle network using a server outside the vehicle, and can therefore contribute to vehicle safety.

BRIEF DESCRIPTION OF DRAWINGS

These and other objects, advantages and features of the disclosure will become apparent from the following descrip

FIG. 4 is a diagram illustrating an example of a vehicle log according to Embodiment 1 of the present disclosure;

FIG. 5 is a diagram illustrating an example of a vehicle log definition table according to Embodiment 1 of the present disclosure;

FIG. 6 is a diagram illustrating an example of vehicle log processing rules according to Embodiment 1 of the present disclosure;

FIG. 7 is a diagram illustrating an example of a processed vehicle log according to Embodiment 1 of the present disclosure;

FIG. 8 is a diagram illustrating an example of a difference generation log according to Embodiment 1 of the present disclosure;

FIG. 9 is a diagram illustrating an example of a difference log according to Embodiment 1 of the present disclosure;

FIG. 13 is a flowchart illustrating difference log generation processing according to Embodiment 1 of the present disclosure; and FIG. 14 is a flowchart illustrating vehicle log restoration processing according to Embodiment 1 of the present disclosure.

DETAILED DESCRIPTION OF THE EMBODIMENTS

Figure 1:
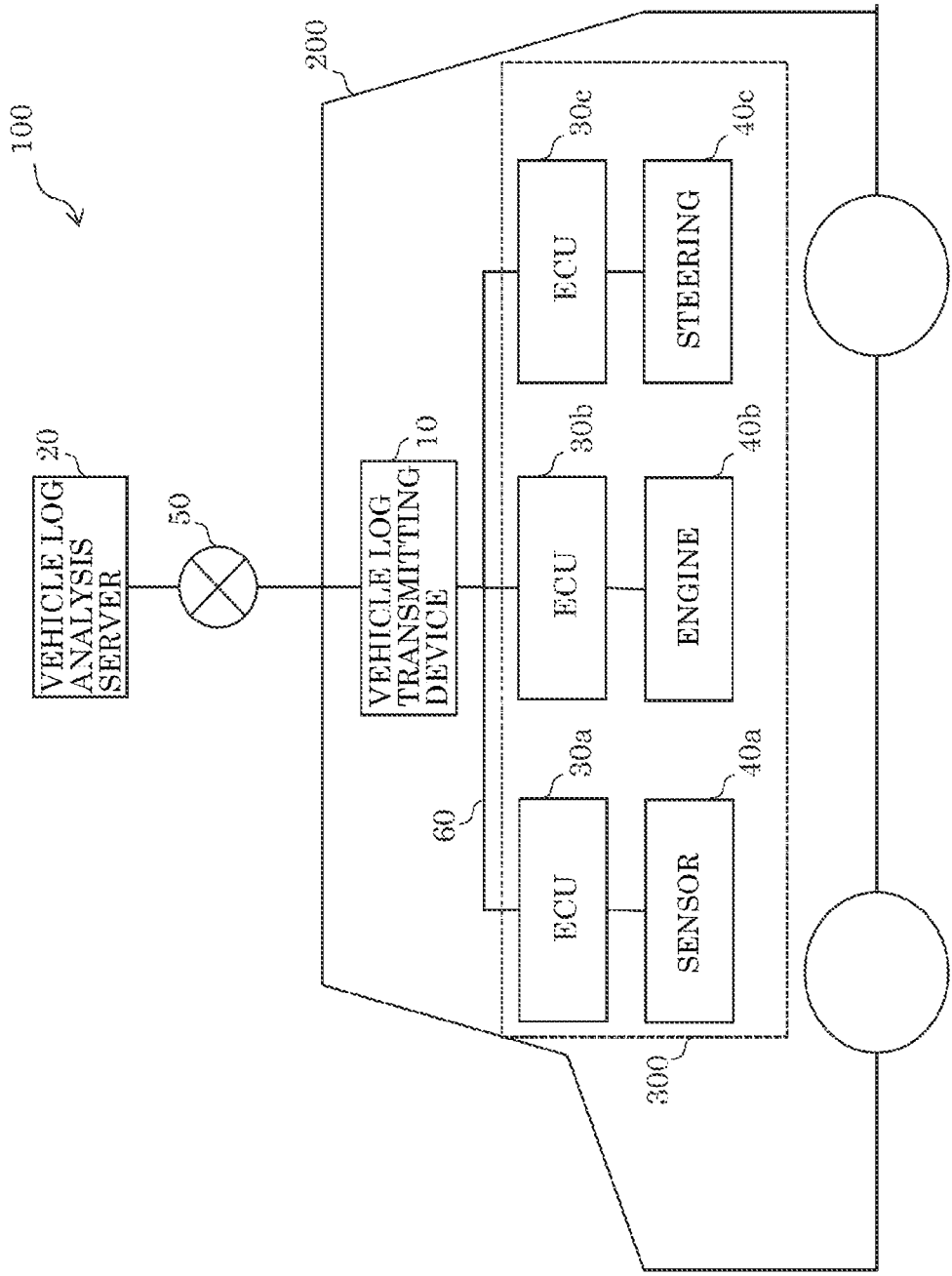
- FIG. 1 is an overall schematic diagram illustrating a vehicle log analysis system according to Embodiment 1 of the present disclosure.

A vehicle log transmission device that transmits a vehicle log to a vehicle log analysis server includes: a vehicle log obtainer that obtains the vehicle log; a vehicle state extractor that extracts a vehicle state from the obtained vehicle log; difference generation log storage that stores a list of difference generation logs, each difference generation log being a vehicle log for each of vehicle states shared between the vehicle log transmission device and the vehicle log analysis server; a difference generation log selector that selects a difference generation log from the list in accordance with the extracted vehicle state; a difference log generator that generates a difference log based on the obtained vehicle log and the selected difference generation log; and a difference log transmitter that transmits, to the vehicle log analysis server, the generated difference log and a difference generation log identifier corresponding to the selected difference generation log.

A log which is likely to arise in a specific vehicle state is shared between the vehicle log transmission device and the vehicle log analysis server as a difference generation log for each vehicle state, and when transmitting the vehicle log to the vehicle log analysis server, the vehicle log transmission device generates the difference log by using different difference generation logs according to the vehicle state at that time. As a result, the vehicle log to be transmitted for that vehicle state and the difference generation log corresponding to that vehicle state resemble each other, which reduces the size of the transmitted difference log, and makes it possible to effectively reduce the amount of communication data for the vehicle log transmitted from the vehicle to a server outside the vehicle (the vehicle log analysis server).

Additionally, the difference generation log storage may store the list of the difference generation logs in each of which a vehicle log previously transmitted to the vehicle log analysis server is associated with a vehicle state at a time of the transmitting.

As a result, a vehicle log transmitted in the past is shared between the vehicle log transmission device and the vehicle log analysis server, and by using the vehicle log transmitted in the past as the difference generation log, it is no longer necessary to set the difference generation log in the vehicle log transmission device in advance, which makes it possible to suppress development costs.

Additionally, the vehicle log may include a plurality of pieces of data respectively associated with IDs indicating a data type; the difference generation log storage may store the list of the difference generation logs both for each of IDs included in the vehicle log and each of vehicle states; the difference generation log selector may select the difference generation log for each ID from the list in accordance with the extracted vehicle state; and the difference log generator may generate the difference log for each ID included in the obtained vehicle log, based on data associated with the ID and the selected difference generation log corresponding to the ID.

By storing the difference generation log for each ID included in the vehicle log in this manner, it is no longer necessary to store all of the plurality of pieces of data included in the vehicle log as the difference generation log, and only the same number of pieces of data as there are ID types need to be stored, which makes it possible to reduce the size of the storage region needed to generate the difference log when the number of the plurality of pieces of data included in the vehicle log is greater than the number of ID types included in the vehicle log.

Additionally, the vehicle log may include a plurality of pieces of data respectively associated with IDs indicating a data type, the plurality of pieces of data being arranged in such a manner that a plurality of the IDs starting with a predetermined ID repeat in a cyclical manner; and the difference generation log selector may select the difference generation log corresponding to the plurality of IDs starting with the predetermined ID from the list in accordance with the extracted vehicle state.

For example, the plurality of pieces of data included in the vehicle log are arranged in such a manner that when a plurality of the IDs starting with a predetermined ID are taken as a single cycle, the plurality of IDs repeat in a cyclical manner, and similar data repeats for each of the plurality of IDs. Thus by using the predetermined ID as the ID from which both the vehicle log and the difference generation log start, the plurality of IDs in a single cycle included in the vehicle log and the plurality of IDs in a single cycle included in the difference generation log match, and the difference between the vehicle log and the difference generation log is reduced, which makes it possible to even more effectively reduce the amount of communication data for the vehicle log transmitted from the vehicle to a server outside the vehicle. Additionally, in the plurality of pieces of data included in the vehicle log, similar data is repeated every plurality of IDs in a single cycle, which makes it possible to reduce the amount of information aside from the data corresponding to the plurality of IDs in the single cycle.

Additionally, the difference generation log storage may store the list of the difference generation logs which have been subjected to replacement processing for replacing a value of data with a predetermined value or rounding processing for rounding a value of data; and the difference log generator may further generate the difference log after subjecting the obtained vehicle log to the replacement processing or the rounding processing.

Accordingly, by setting values in data regions, such as a counter or a checksum, which are likely to differ between the vehicle log and the difference generation log to the same predetermined value in both the vehicle log and the difference generation log, by rounding off fine values, such as sensor information, which are not needed to detect an anomaly from the vehicle log, and so on, the vehicle log to be transmitted and the difference generation log will resemble each other. The transmitted difference log is reduced in size as a result, which makes it possible to even more effectively reduce the amount of communication data for the vehicle log transmitted from the vehicle to a server outside the vehicle.

Additionally, the vehicle log may include a plurality of pieces of data respectively associated with of time information; the difference generation log storage may store the list of the difference generation logs in which the time information has been replaced with index information; the difference log generator may further generate the difference log after replacing the time information included in the obtained vehicle log with the index information; and the difference log transmitter may further transmit, to the vehicle log analysis server, a time list expressing a correspondence relationship between the time information and the index information.

Accordingly, by replacing the values of time information highly likely to be different between the vehicle log and the difference generation log with index information in the vehicle log and the difference generation log, the vehicle log and the difference generation log will resemble each other even more. The transmitted difference log is reduced in size as a result, which makes it possible to even more effectively reduce the amount of communication data for the vehicle log transmitted from the vehicle to a server outside the vehicle.

Additionally, the vehicle log may include the plurality of pieces of data respectively associated with IDs indicating a data type; the difference generation log storage may store the list of the difference generation logs sorted by a magnitude of a value of the ID, with difference generation logs having the same ID being sorted by data size; and the difference log generator may further generate the difference log after replacing the time information with index information for the obtained vehicle log and sorting by the magnitude of the value of the ID, with difference generation logs having the same ID being sorted by data size.

Accordingly, by sorting the vehicle log and the difference generation log in order from the highest to lowest ID (and in order from the largest to smallest data, when the IDs are the same), the likelihood that the vehicle log and the difference generation log will match increases, even when data including a specific ID arises irregularly and the order in which IDs appear is not constant, when variable-valued data is included in the vehicle log, and so on. The difference between the vehicle log and the difference generation log can therefore be reduced, and thus the transmitted difference log is reduced in size, which makes it possible to even more effectively reduce the amount of communication data for the vehicle log transmitted from the vehicle to a server outside the vehicle.

Additionally, the difference log generator may use the selected difference generation log as a data compression dictionary, compress the obtained vehicle log according to a predetermined compression algorithm, and generate the compressed vehicle log as the difference log.

It is therefore not necessary to prepare a dictionary with a high compression rate in advance for each vehicle state, and the data can be compressed efficiently, which makes it possible to reduce development costs.

A vehicle log analysis system includes a vehicle log transmission device and a vehicle log analysis server. The vehicle log analysis system transmits a vehicle log from the vehicle log transmission device to the vehicle log analysis server. The vehicle log transmission device includes: a vehicle log obtainer that obtains the vehicle log; a vehicle state extractor that extracts a vehicle state from the obtained vehicle log; difference generation log storage that stores a list of difference generation logs, each difference generation log being a vehicle log for each of vehicle states shared between the vehicle log transmission device and the vehicle log analysis server; a difference generation log selector that selects a difference generation log from the list in accordance with the extracted vehicle state; a difference log generator that generates a difference log based on the obtained vehicle log and the selected difference generation log; and a difference log transmitter that transmits, to the vehicle log analysis server, the generated difference log and a difference generation log identifier corresponding to the selected difference generation log. The vehicle log analysis server includes: a difference log receiver that receives the difference log and the difference generation log identifier transmitted from the difference log transmitter; restoration log storage that stores the list; and a vehicle log restorer that specifies the difference generation log used to generate the difference log from the difference generation log identifier and the list, and restores the vehicle log based on the difference log and the specified difference generation log.

A log which is likely to arise in a specific vehicle state is shared between the vehicle log transmission device and the vehicle log analysis server as a difference generation log for each vehicle state, and when transmitting the vehicle log to the vehicle log analysis server, the vehicle log transmission device generates the difference log by using different difference generation logs according to the vehicle state at that time. As a result, the vehicle log to be transmitted for that vehicle state and the difference generation log corresponding to that vehicle state resemble each other, which reduces the size of the transmitted difference log, and makes it possible to effectively reduce the amount of communication data for the vehicle log transmitted from the vehicle to a server outside the vehicle (the vehicle log analysis server).

Additionally, the difference generation log storage and the restoration log storage may store the list of the difference generation logs in which a vehicle log previously transmitted to the vehicle log analysis server is associated with a vehicle state at a time of the transmitting.

As a result, a vehicle log transmitted in the past is shared between the vehicle log transmission device and the vehicle log analysis server, and by using the vehicle log transmitted in the past as the difference generation log, it is no longer necessary to set the difference generation log in the vehicle log transmission device in advance, which makes it possible to suppress development costs.

Additionally, the vehicle log may include a plurality of pieces of data respectively associated with IDs indicating a data type; the difference generation log storage and the restoration log storage may store the list of difference generation logs both for each of IDs included in the vehicle log and each of vehicle states; the difference generation log selector may select the difference generation log for each ID from the list in accordance with the extracted vehicle state; the difference log generator may generate the difference log for each ID included in the vehicle log that has been obtained, based on data associated with the ID and the selected difference generation log corresponding to the ID; and the vehicle log restorer may restore the vehicle log for each ID included in the difference log, based on data associated with the ID and the specified difference generation log corresponding to the ID.

By storing the difference generation log for each ID included in the vehicle log in this manner, it is no longer necessary to store all of the plurality of pieces of data included in the vehicle log as the difference generation log, and only the same number of pieces of data as there are ID types need to be stored, which makes it possible to reduce the size of the storage region needed to generate the difference log when the number of the plurality of pieces of data included in the vehicle log is greater than the number of ID types included in the vehicle log.

Additionally, the vehicle log may include a plurality of pieces of data respectively associated with IDs indicating a data type, the plurality of pieces of data being arranged in such a manner that a plurality of the IDs starting with a predetermined ID repeat in a cyclical manner; the difference generation log selector may select the difference generation log corresponding to a plurality of IDs starting with the predetermined ID from the list in accordance with the extracted vehicle state; and the vehicle log restorer may specify the difference generation logs corresponding to a plurality of IDs starting from the predetermined ID, and restore the vehicle log based on the difference log and the specified difference generation log.

For example, the plurality of pieces of data included in the vehicle log are arranged in such a manner that when a plurality of the IDs starting with a predetermined ID are taken as a single cycle, the plurality of IDs repeat in a cyclical manner, and similar data repeats for each of the plurality of IDs. Thus by using the predetermined ID as the ID from which both the vehicle log and the difference generation log start, the plurality of IDs in a single cycle included in the vehicle log and the plurality of IDs in a single cycle included in the difference generation log match, and the difference between the vehicle log and the difference generation log is reduced, which makes it possible to even more effectively reduce the amount of communication data for the vehicle log transmitted from the vehicle to a server outside the vehicle. Additionally, in the plurality of pieces of data included in the vehicle log, similar data is repeated every plurality of IDs in a single cycle, which makes it possible to reduce the amount of information aside from the data corresponding to the plurality of IDs in the single cycle.

Additionally, the difference generation log storage and the restoration log storage may store the list of the difference generation logs which have been subjected to replacement processing for replacing a data value with a predetermined value or rounding processing for rounding a data value; and the difference log generator may further generate the difference log after subjecting the obtained vehicle log to the replacement processing or the rounding processing.

Accordingly, by setting values in data regions, such as a counter or a checksum, which are likely to differ between the vehicle log and the difference generation log, to the same predetermined value in both the vehicle log and the difference generation log, by rounding off fine values, such as sensor information, which are not needed to detect an anomaly from the vehicle log, and so on, the vehicle log to be transmitted and the difference generation log will resemble each other. The transmitted difference log is reduced in size as a result, which makes it possible to even more effectively reduce the amount of communication data for the vehicle log transmitted from the vehicle to a server outside the vehicle.

Additionally, the vehicle log may include a plurality of pieces of data respectively associated with time information; the difference generation log storage and the restoration log storage may store the list of the difference generation logs in which the time information has been replaced with index information; the difference log generator may further generate the difference log after replacing the time information included in the obtained vehicle log with the index information; the difference log transmitter may further transmit, to the vehicle log analysis server, a time list expressing a correspondence relationship between the time information and the index information; and the vehicle log restorer may further restore the vehicle log by referring to the transmitted time list and replacing the index information with the time information.

Accordingly, by replacing the values of time information highly likely to be different between the vehicle log and the difference generation log with index information in the vehicle log and the difference generation log, the vehicle log and the difference generation log will resemble each other even more. The transmitted difference log is reduced in size as a result, which makes it possible to even more effectively reduce the amount of communication data for the vehicle log transmitted from the vehicle to a server outside the vehicle.

Additionally, the vehicle log may include the plurality of pieces of data respectively associated with IDs indicating a data type; the difference generation log storage and the restoration log storage may store the list of the difference generation logs sorted by a magnitude of a value of the ID, with difference generation logs having the same ID being sorted by data size; the difference log generator may further generate the difference log after replacing the time information with index information for the obtained vehicle log and sorting the difference generation logs by the magnitude of the value of the ID, with difference generation logs having the same ID being sorted by data size; and the vehicle log restorer may further restore the vehicle log by referring to the transmitted time list, replacing the index information with the time information, and sorting the vehicle log in order from the earliest time.

Accordingly, by sorting the vehicle log and the difference generation log in order from the highest to lowest ID (and in order from the largest to smallest data, when the IDs are the same), the likelihood that the vehicle log and the difference generation log will match increases, even when data including a specific ID arises irregularly and the order in which IDs appear is not constant, when variable-valued data is included in the vehicle log, and so on. The difference between the vehicle log and the difference generation log can therefore be reduced, and thus the transmitted difference log is reduced in size, which makes it possible to even more effectively reduce the amount of communication data for the vehicle log transmitted from the vehicle to a server outside the vehicle.

Additionally, the difference log generator may use the selected difference generation log as a data compression dictionary, compress the obtained vehicle log according to a predetermined compression algorithm, and generate the compressed vehicle log as the difference log; and the vehicle log restorer may restore the vehicle log by using the specified difference generation log as a data compression dictionary and decompressing the difference log according to the predetermined compression algorithm.

It is therefore not necessary to prepare a dictionary with a high compression rate in advance for each vehicle state, and the data can be compressed efficiently, which makes it possible to reduce development costs.

Additionally, the vehicle state extractor may extract at least one of a vehicle speed, a driving assistance mode, an autonomous driving mode, a travel location, weather, or temperature, included in the vehicle log, as the vehicle state.

Through this, when the vehicle has a function unique to when the vehicle is stopped or a function unique to when the vehicle is traveling at a high speed, preparing difference generation logs for each vehicle speed results in the logs produced by the unique functions resembling each other for each vehicle speed. Additionally, when the vehicle has a function unique to when a driving assistance mode is active or a function unique to when an autonomous driving mode is active, preparing difference generation logs for each travel mode of the vehicle results in the logs produced by the unique functions resembling each other for each travel mode of the vehicle. Additionally, by preparing difference generation logs for each travel area of the vehicle, logs of the vehicle traveling on the same roads or the same routes will resemble each other. Additionally, by preparing difference generation logs for each temperature, weather, or the like for the vehicle, logs of air conditioner control for the vehicle traveling at the same temperature, logs for wiper control of the vehicle traveling in the same weather, and so on will resemble each other. In this manner, the vehicle speed, driving assistance mode, autonomous driving mode, travel location, weather, or temperature serving as vehicle states are highly correlated with vehicle logs, and because difference logs transmitted for the same vehicle states are smaller, the amount of communication data for the vehicle log transmitted from the vehicle to a server outside the vehicle can be even more effectively reduced.

Additionally, the vehicle log obtainer may obtain, as the vehicle log, at least one of the following: an in-vehicle network log according to the CAN or CAN-FD protocol, the in-vehicle network log including a frame ID as the ID of the vehicle log; an in-vehicle network log according to the FlexRay (registered trademark) protocol, the in-vehicle network log including a slot ID as the ID of the vehicle log; an in-vehicle network log according to the Ethernet (registered trademark) protocol, the in-vehicle network log including an IP address as the ID of the vehicle log; and a system operation log including a process number as the ID of the vehicle log.

Accordingly, by obtaining the vehicle logs using a specific protocol or system, the vehicle log formats can be unified, and because difference logs transmitted for the same vehicle states are smaller as a result, the amount of communication data for the vehicle log transmitted from the vehicle to a server outside the vehicle can be even more effectively reduced.

Additionally, the vehicle log analysis server may further include: an anomalous log detector that monitors the restored vehicle log and detects a case where the restored vehicle log contains evidence of an attack as an anomaly; and an anomaly notifier that notifies a predetermined notification target.

Through this, when an anomaly in terms of security has been detected from a restored vehicle log, the vehicle can notify a predetermined notification target of the anomaly.

Additionally, a vehicle log transmission/reception method includes a vehicle log transmitting method performed by a vehicle log transmission device and a vehicle log receiving method performed by a vehicle log analysis server. The vehicle log transmission/reception method transmits a vehicle log from the vehicle log transmission device to the vehicle log analysis server. The vehicle log transmission device includes difference generation log storage that stores a list of difference generation logs, each difference generation log being a vehicle log for each of vehicle states shared between the vehicle log transmission device and the vehicle log analysis server. The vehicle log analysis server includes restoration log storage that stores the list. The vehicle log transmitting method includes: obtaining the vehicle log; extracting a vehicle state from the obtained vehicle log; selecting a difference generation log from the list in accordance with the extracted vehicle state; generating a difference log based on the obtained vehicle log and the selected difference generation log; and transmitting, to the vehicle log analysis server, the generated difference log and a difference generation log identifier corresponding to the selected difference generation log. The vehicle log receiving method includes: receiving the difference log and the difference generation log identifier transmitted in the transmitting; and specifying the difference generation log used to generate the difference log from the difference generation log identifier and the list, and restoring the vehicle log based on the difference log and the specified difference generation log.

A log which is likely to arise in a specific vehicle state is shared between the vehicle log transmission device and the vehicle log analysis server as a difference generation log for each vehicle state, and when transmitting the vehicle log to the vehicle log analysis server, the vehicle log transmission device generates the difference log by using different difference generation logs according to the vehicle state at that time. As a result, the vehicle log to be transmitted for that vehicle state and the difference generation log corresponding to that vehicle state resemble each other, which reduces the size of the transmitted difference log, and makes it possible to effectively reduce the amount of communication data for the vehicle log transmitted from the vehicle to a server outside the vehicle (the vehicle log analysis server).

Note that these comprehensive or specific aspects may be realized by a system, a method, an integrated circuit, a computer program, or a computer-readable recording medium such as a CD-ROM, or may be implemented by any desired combination of systems, devices, methods, integrated circuits, computer programs, or recording media.

A vehicle log transmission device, a vehicle log analysis system, and a vehicle log transmission/reception method according to embodiments will be described hereinafter with reference to the drawings. Each of the following embodiments describes a specific example of the present disclosure. As such, the numerical values, constituent elements, arrangements and connection states of constituent elements, steps serving as elements of processing, orders of steps, and the like in the following embodiments are merely examples, and are not intended to limit the present disclosure. Additionally, of the constituent elements in the following embodiments, constituent elements not denoted in the independent claims are considered to be optional constituent elements. Additionally, the drawings are schematic diagrams, and are not necessarily exact illustrations.

Embodiment 1

Overall Configuration of Vehicle Log Analysis System

FIG. 1 is an overall schematic diagram illustrating vehicle log analysis system 100 according to Embodiment 1 of the present disclosure.

In FIG. 1, vehicle log analysis system 100 is constituted by vehicle log analysis server 20 and vehicle 200, and vehicle log analysis server 20 and vehicle 200 are connected over external network 50. External network 50 is the Internet, for example. A communication method of external network 50 may be wired or wireless. Additionally, the wireless communication method may be an existing technology such as Wi-Fi (registered trademark), 3G/LTE (Long Term Evolution), or the like.

Vehicle 200 includes vehicle log transmission device 10, ECU 30a, ECU 30b, ECU 30c, sensor 40a, engine 40b, and steering 40c.

Vehicle log transmission device 10 is connected to vehicle log analysis server 20 over external network 50.

In vehicle 200, vehicle log transmission device 10, ECU 30a, ECU 30b, and ECU 30c are connected to each other over vehicle network 60. Vehicle network 60 is a CAN, for example. Note that vehicle network 60 may use a communication protocol such as CAN-FD, FlexRay, Ethernet, or the like.

ECU 30a is connected to sensor 40a, ECU 30b is connected to engine 40b, and ECU 30c is connected to steering 40c.

ECUs 30a, 30b, and 30c obtain states of the devices to which those ECUs are respectively connected, and periodically send messages expressing the obtained states to vehicle network 60.

ECU 30a obtains sensor information measured by sensor 40a, which measures acceleration of vehicle 200, and sends a message including a data value expressing the sensor information to vehicle network 60.

ECU 30b obtains a rotation rate, which is one state of engine 40b, and sends a message including a data value expressing the rotation rate to vehicle network 60. ECU 30b also controls the rotation rate of engine 40b based on information pertaining to engine 40b obtained from vehicle network 60.

ECU 30c obtains a steering angle of steering 40c, and sends a message including a data value expressing the steering angle to vehicle network 60. ECU 30c also controls the steering angle of steering 40c based on information pertaining to steering 40c obtained from vehicle network 60.

Hereinafter, ECU 30a, ECU 30b, and ECU 30c connected to vehicle network 60, as well as sensor 40a, engine 40b, and steering 40c, will be collectively referred to as "vehicle system 300".

Vehicle log transmission device 10 obtains a vehicle log from ECUs 30a, 30b, and 30c, and sends the obtained vehicle log to vehicle log analysis server 20 using a communication protocol such as HTTPS. Details of the vehicle log, as well as details of the method for transmitting the vehicle log, will be given later.

Vehicle log analysis server 20 is a server, located outside vehicle 200, which receives the vehicle log from vehicle log transmission device 10, analyzes the received vehicle log, and detects a security threat, i.e., detects an anomaly in vehicle 200.

Configuration of Vehicle Log Transmission Device

Vehicle log transmission device 10 will be described next.

Figure 2:
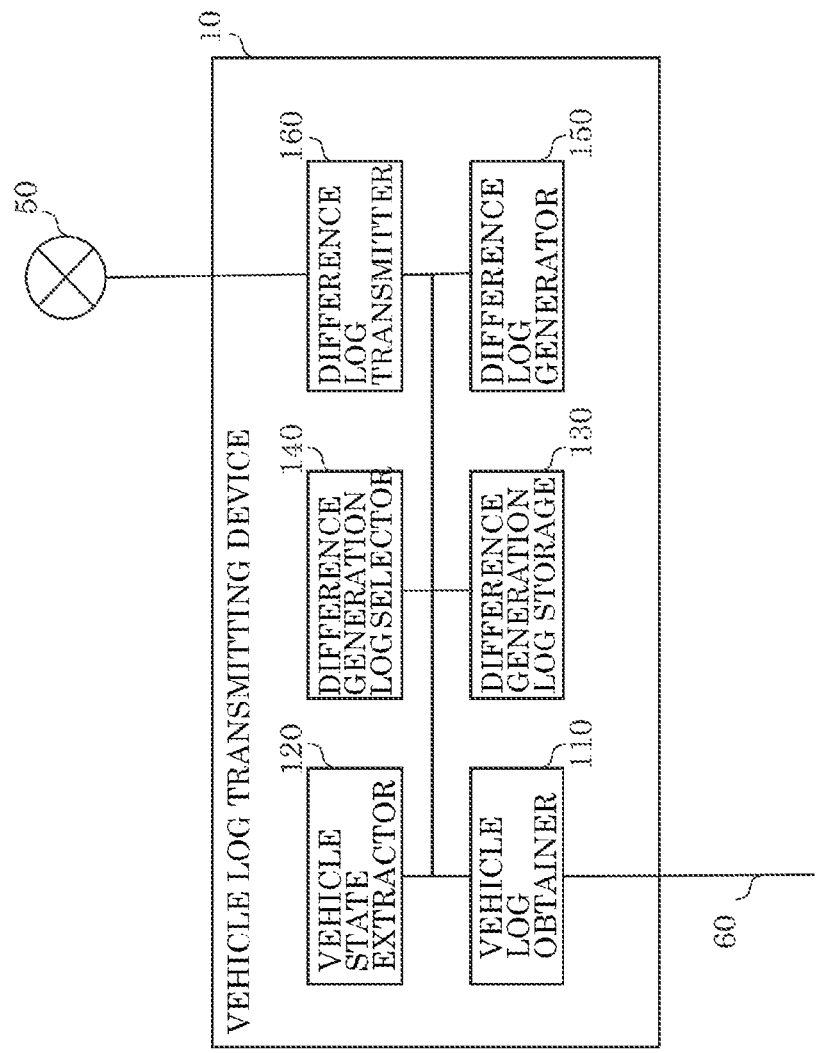
FIG. 2 is a block diagram illustrating a vehicle log transmission device according to Embodiment 1 of the present disclosure.

FIG. 2 is a block diagram illustrating vehicle log transmission device 10 according to Embodiment 1 of the present disclosure. Vehicle log transmission device 10 is a device that transmits the vehicle log to vehicle log analysis server 20. As illustrated in FIG. 2, vehicle log transmission device 10 includes vehicle log obtainer 110, vehicle state extractor 120, difference generation log storage 130, difference generation log selector 140, difference log generator 150, and difference log transmitter 160.

Vehicle log obtainer 110 is connected to vehicle system 300 over vehicle network 60. Vehicle log obtainer 110 obtains the vehicle log, which includes a plurality of pieces of data pertaining to operations of vehicle 200, and communicates the obtained vehicle log to vehicle state extractor 120 and difference log generator 150. Note that the vehicle log may include a plurality of pieces of data associated with corresponding IDs indicating data types. Additionally, the vehicle log may include a plurality of pieces of data associated with corresponding IDs indicating data types, the plurality of pieces of data being arranged in such a manner that when a plurality of the IDs starting with a predetermined ID are taken as a single cycle, the plurality of IDs repeat in a cyclical manner. Additionally, the vehicle log may include a plurality of pieces of data associated with corresponding pieces of time information.

Vehicle state extractor 120 obtains a vehicle state included in the vehicle log obtained by vehicle log obtainer 110, and communicates the obtained vehicle state to difference generation log selector 140.

Here, "vehicle state" is a state of vehicle 200, and in the present embodiment, refers to at least one piece of information among a speed of vehicle 200, a travel mode of vehicle 200 (e.g., a driving assistance mode, an autonomous driving mode, or the like), a travel area, a temperature, and weather. For example, vehicle state extractor 120 extracts at least one of the vehicle speed, the driving assistance mode, the autonomous driving mode, a travel location, the weather, and the temperature, which are included in the vehicle log, as the vehicle state. Note that vehicle state extractor 120 may extract a vehicle speed range. For example, when the vehicle speed is 20 km/h, vehicle state extractor 120 may extract a vehicle speed range of 0 to 30 km/h. Vehicle state extractor 120 may also extract a temperature range. For example, when the temperature is 33 degrees, vehicle state extractor 120 may extract a temperature range of 30 to 35 degrees. Additionally, the location of the vehicle state in the vehicle log is defined in a vehicle log definition table in advance, and vehicle state extractor 120 can extract the vehicle state by using the vehicle log definition table to refer to the location of the vehicle log. Details of the vehicle log definition table will be given later.

Difference generation log storage 130 stores a list of difference generation logs, which are vehicle logs for each of vehicle states shared between vehicle log transmission device 10 and vehicle log analysis server 20. For example, difference generation log storage 130 may store a list of difference generation logs in which vehicle logs transmitted to vehicle log analysis server 20 in the past are associated with the vehicle states from when those vehicle logs were transmitted. Additionally, for example, difference generation log storage 130 may store a list of difference generation logs for each of IDs included in the vehicle logs and each of vehicle states. Additionally, for example, difference generation log storage 130 may store a list of difference generation logs which have been subjected to replacement processing for replacing data values with predetermined values or rounding processing for rounding the data values. Additionally, for example, difference generation log storage 130 may store a list of difference generation logs in which the time information has been replaced with index information. Additionally, for example, difference generation log storage 130 may store a list of difference generation logs sorted by the magnitude of a value of the ID, where logs having the same ID are sorted by data size.

Difference generation log selector 140 receives the vehicle state extracted by vehicle state extractor 120 and selects a difference generation log from the list stored in difference generation log storage 130 in accordance with the extracted vehicle state. For example, difference generation log selector 140 selects the difference generation log corresponding to the extracted vehicle state. Difference generation log selector 140 then communicates a number of the selected difference generation log to difference log generator 150 and difference log transmitter 160.

Difference log generator 150 generates a difference log based on the vehicle log obtained by vehicle log obtainer 110 and the difference generation log selected by difference generation log selector 140. Specifically, difference log generator 150 receives the vehicle log from vehicle log obtainer 110, receives the number of the difference generation log from difference generation log selector 140, and obtains a difference generation log corresponding to the number of the difference generation log from difference generation log storage 130. Then, for example, difference log generator 150 processes the vehicle log in accordance with rules, calculates a difference between the processed vehicle log and the difference generation log, and communicates a difference log, which is a result of the calculation, and vehicle log processing rules, which are the rules used to process the vehicle log, to difference log transmitter 160. Details of the vehicle log processing rules and the difference log will be given later. For example, difference log generator 150 may generate the difference log for each ID included in the obtained vehicle log, based on data associated with the ID and the selected difference generation log corresponding to the ID. Additionally, for example, difference log generator 150 may further generate the difference log after subjecting the obtained vehicle log to replacement processing or rounding processing. Additionally, for example, difference log generator 150 may further generate the difference log after replacing the time information included in the obtained vehicle log with index information. Additionally, for example, difference log generator 150 may further generate the difference log after replacing the time information with index information for the obtained vehicle log and sorting by the magnitude of a value of the ID, where logs having the same ID are sorted by data size. Additionally, for example, difference log generator 150 may use the selected difference generation log as a data compression dictionary to compress the obtained vehicle log according to a predetermined compression algorithm, and generate the compressed vehicle log as the difference log.

Difference log transmitter 160 transmits the difference log generated by difference log generator 150, and a difference generation log identifier corresponding to the difference generation log selected by difference log generation log selector 140, to the vehicle log analysis server 20. Specifically, difference log transmitter 160 receives the number of the difference generation log from difference generation log selector 140 as the difference generation log identifier, receives the difference log from difference log generator 150, losslessly-compresses the difference log, and transmits the losslessly-compressed difference log and the number of the difference generation log to vehicle log analysis server 20.

Block Diagram of Vehicle Log Analysis Server 20

Figure 3:
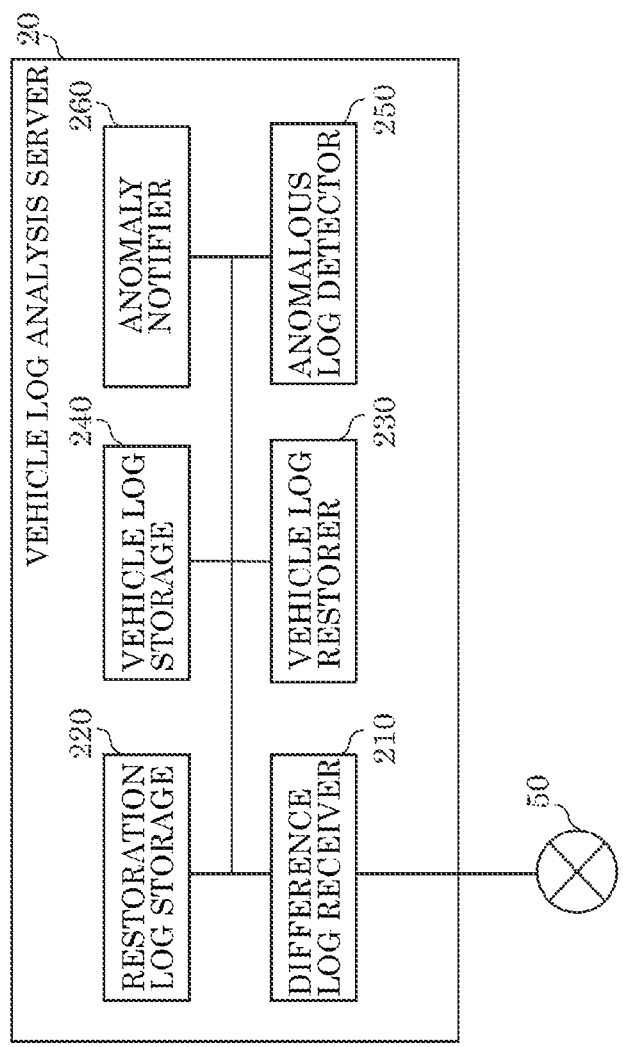
FIG. 3 is a block diagram illustrating a vehicle log analysis server according to Embodiment 1 of the present disclosure.

FIG. 3 is a block diagram illustrating vehicle log analysis server 20 according to Embodiment 1 of the present disclosure. Vehicle log analysis server 20 is a device that receives the vehicle log from vehicle log transmission device 10. As illustrated in FIG. 3, vehicle log analysis server 20 includes difference log receiver 210, restoration log storage 220, vehicle log restorer 230, vehicle log storage 240, anomalous log detector 250, and anomaly notifier 260.

Difference log receiver 210 is connected to external network 50, receives the losslessly-compressed difference log and the difference generation log identifier (the number of the difference generation log) transmitted from vehicle log transmission device 10 (difference log transmitter 160) over external network 50, decompresses the losslessly-compressed difference log, and communicates the decompressed difference log and the number of the difference generation log to vehicle log restorer 230.

Restoration log storage 220 stores a list of difference generation logs that is the same as the list of the difference generation log stored in the difference generation log storage 130 of vehicle log transmission device 10. In other words, restoration log storage 220 stores a list of difference generation logs, which are vehicle logs for each of vehicle states shared between vehicle log transmission device 10 and vehicle log analysis server 20. For example, restoration log storage 220 may store a list of difference generation logs in which vehicle logs transmitted to vehicle log analysis server 20 in the past are associated with the vehicle states from when those vehicle logs were transmitted. Additionally, for example, restoration log storage 220 may store a list of difference generation logs for each of IDs included in the vehicle logs and each of vehicle states. Additionally, for example, restoration log storage 220 may store a list of difference generation logs which have been subjected to replacement processing for replacing data values with predetermined values or rounding processing for rounding the data values. Additionally, for example, restoration log storage 220 may store a list of difference generation logs in which the time information has been replaced with index information. Additionally, for example, restoration log storage 220 may store a list of difference generation logs sorted by the magnitude of a value of the ID, where logs having the same ID are sorted by data size.

Vehicle log restorer 230 specifies a difference generation log used to generate the difference log, from the difference generation log identifier and the list stored in restoration log storage 220, and restores the vehicle log based on the difference log and the specified difference generation log. Specifically, vehicle log restorer 230 receives the difference log and the number of the difference generation log from difference log receiver 210, obtains the difference generation log corresponding to the number of the difference generation log from restoration log storage 220, calculates a difference between the difference log and the difference generation log, and restores the vehicle log. For example, vehicle log restorer 230 may restore the vehicle log for each ID included in the obtained difference log, based on data associated with the ID and the specified difference generation log corresponding to the ID. Additionally, for example, vehicle log restorer 230 may specify difference generation logs corresponding to a plurality of IDs starting from a predetermined ID, and restore the vehicle log based on the difference log and the specified difference generation log. Additionally, for example, vehicle log restorer 230 may further restore the vehicle log by referring to a time list which has been transmitted and replacing index information with time information. Additionally, for example, vehicle log restorer 230 may further restore the vehicle log by referring to a time list which has been transmitted, replacing index information with time information, and sorting by the earliest time. Additionally, for example, vehicle log restorer 230 may restore the vehicle log by using a specified difference generation log as a data compression dictionary and decompressing the difference log according to a predetermined compression algorithm. Furthermore, vehicle log restorer 230 records the vehicle log in vehicle log storage 240. Details of the method for restoring the vehicle log will be given later.

Vehicle log storage 240 stores the restored vehicle log.

Anomalous log detector 250 monitors the restored vehicle logs stored in vehicle log storage 240, detects a vehicle log which includes evidence of an attack as an anomalous log, and communicates the anomalous log to anomaly notifier 260. For example, when the vehicle logs include a log manipulated by a vehicle apparatus at a timing different from a normal processing sequence, a log in which network communication including control values has been performed outside a normal range, and so on, anomalous log detector 250 assumes this is evidence of a cyber attack on vehicle 200, and detects this as a security threat.

Anomaly notifier 260 notifies a predetermined notification target that there is an anomaly in the vehicle. Specifically, anomaly notifier 260 has a function for receiving the anomalous vehicle log from anomalous log detector 250 and notifying, for example, an operator using vehicle log analysis server 20, a driver of the vehicle, or the like, who act as the predetermined notification target, of the anomaly.

Vehicle Log

FIG. 4 is a diagram illustrating an example of the vehicle log obtained by vehicle log obtainer 110 according to Embodiment 1 of the present disclosure. The vehicle log includes a plurality of pieces of data associated with corresponding IDs indicating data types. The vehicle log illustrated in FIG. 4 includes ID 1, ID 2, ID 3, and ID 4 as the IDs. Additionally, the vehicle log illustrated in FIG. 4 includes a plurality of pieces of data, each piece of data having 8 bytes. When the 8-byte data is taken as a single piece of data, an ID is associated with that single piece of data. Additionally, as illustrated in FIG. 4, the plurality of pieces of data are arranged in such a manner that when a plurality of the IDs starting with a predetermined ID are taken as a single cycle, the plurality of IDs repeat in a cyclical manner. For example, assuming the predetermined ID is ID 1, the plurality of pieces of data are arranged in such a manner that when ID 1, ID 2, ID 3, and ID 4 are taken as a single cycle starting with ID 1, ID 1, ID 2, ID 3, and ID 4 repeat in a cyclical manner. Note that the predetermined ID is not limited to ID 1. For example, assuming the predetermined ID is ID 2, the plurality of pieces of data are arranged in such a manner that when ID 2, ID 3, ID 4, and ID 1 are taken as a single cycle starting with ID 2, ID 2, ID 3, ID 4, and ID 1 repeat in a cyclical manner. Additionally, as illustrated in FIG. 4, the plurality of pieces of data are associated with corresponding pieces of time information. For example, a time such as "10:10:10" (10 hours, 10 minutes, 10 seconds) is the time information. In FIG. 4, the vehicle log is constituted by a set including a time, an ID, and 8-byte data (eight pieces of 1-byte data). The time is the time at which the vehicle log was generated.

The ID is an identifier indicating the type of the data, and for example, specifies an event or a message serving as the basis for generating the vehicle log. For example, the ID is a process number when the vehicle log is an event indicating an ECU system operation; the ID is a frame ID when the vehicle log is a message based on the CAN or CAN-FD communication protocol; the ID is a slot ID when the vehicle log is a message based on the FlexRay communication protocol; and the ID is an IP address when the vehicle log is a message based on the Ethernet communication protocol.

Each of the plurality of pieces of data is, for example, 8-byte data constituted by hexadecimal values from 0x00 to 0xFF for each single byte. In FIG. 4, the data is indicated without the 0x hexadecimal notation. For example, in FIG. 4, the first line in the vehicle log is an event or message generated at time "10:10:10", where the ID is "ID 1", the first byte is "01" in hexadecimal notation, the second byte is "50" in hexadecimal notation, the third byte is "41" in hexadecimal notation, the fourth byte is "30" in hexadecimal notation, the fifth byte is "30" in hexadecimal notation, the sixth byte is "30" in hexadecimal notation, the seventh byte is "30" in hexadecimal notation, and the eighth byte is "30" in hexadecimal notation.

What the data value of each byte in the vehicle log represents is found by referring to the vehicle log definition table. Details of the vehicle log definition table will be given later.

Additionally, in FIG. 4, the vehicle log having an ID of "ID 1" is also generated at times "10:20:10", "10:50:10", and the like after being generated at time "10:10:10", which indicates that the event or message having an ID of "ID 1" is being generated periodically.

Additionally, in FIG. 4, the vehicle log having an ID of "ID 2" is indicated as having been generated after the event or message having an ID of "ID 1". In other words, the plurality of pieces of data are arranged in such a manner that the plurality of IDs (here, ID 1, ID 2, ID 3, and ID 4) repeat in a cyclical manner.

In this manner, the generation time and data of an event or message can be confirmed by referring to the vehicle log. Accordingly, whether or not vehicle system 300 has operated at a timing different from a normal processing sequence, whether or not network communication including a control value outside of normal range was performed, and so on can be determined using the vehicle log, which makes it possible to detect security threats.

Vehicle Log Definition Table

FIG. 5 is a diagram illustrating an example of the vehicle log definition table used by vehicle state extractor 120 and difference log generator 150 according to Embodiment 1 of the present disclosure. The vehicle log definition table is a table that defines data types indicating what the data value of each byte represents for each ID in the vehicle log.

In FIG. 5, when the ID is "ID 1", the first byte defines "counter", and the second to eighth bytes define "vehicle number".

When the ID is "ID 2", the first byte defines "counter", the second byte defines "checksum", the third and fourth bytes define "speed", the fifth byte defines "shift", and the sixth to eighth bytes are unused and are therefore undefined.

When the ID is "ID 3", the first byte defines "counter", the second byte defines "checksum", the third and fourth bytes define "steering angle", and the fifth to eighth bytes are unused and are therefore undefined.

Next, when the ID is "ID 4", the first byte defines "counter", the second byte defines "vehicle state", the third and fourth bytes define "location information", the fifth byte defines "wipers", the sixth byte defines "air conditioner", and the seventh and eighth bytes are unused and are therefore undefined.

The "vehicle number" which is defined is a 7-byte value, and is a fixed value for each vehicle. The "speed", "steering angle", and "location information" which are defined are 2-byte values, and are values from 0000 to FFFF. The "checksum" and "counter" which are defined are 1-byte values, and are values from 00 to FF. The "vehicle state" which is defined indicates "stopped" when the value is "00", "cruise control mode" when the value is "01", "Japan, Osaka Pref., Osaka City" when the value is "02", and "rain, 20 degrees" when the value is "03". The "wipers" and "air conditioner" which are defined indicate "running" when the value is "01" and "not running" when the value is "00". The "shift" which is defined indicates "parking" when the value is "00" and "drive" when the value is "01". Here, "cruise control mode" is a mode in which vehicle 200 is caused to travel autonomously while following a vehicle in front of vehicle 200.

By referring to the vehicle log and the vehicle log definition table, vehicle state extractor 120 can confirm, for example, where in the vehicle log the counter, checksum, and vehicle state are stored.

Vehicle Log Processing Rules

The vehicle log processing rules will be described next. The vehicle log processing rules are rules indicating what kind of rules were used when difference log generator 150 generated the processed vehicle log from the vehicle log. The vehicle log processing rules are generated when difference log generator 150 generates the processed vehicle log from the vehicle log.

FIG. 6 is a diagram illustrating an example of the vehicle log processing rules used by difference log generator 150 according to Embodiment 1 of the present disclosure. In FIG. 6, the vehicle log processing rules are constituted by a set of a processing item, processing Y/N, a value before processing, and a value after processing.

The processing item is one of "time index", "ID sorting (ascending order)", "data sorting (ascending order)", and "data replacement". The vehicle log processing rules indicate rules for processing the vehicle log in order from the top.

"Time index" indicates rules for processing that replaces the times in the vehicle logs with index information. For example, in FIG. 6, time index indicates rules for assigning serial numbers (T11, T12, and so on up to T54) to the times for each ID.

"ID sorting (ascending order)" indicates rules for processing the vehicle logs to be sorted in order from the lowest ID. Although FIG. 6 illustrates "ID sorting (ascending order)" as one example, when the logs are sorted in order from the highest ID, this is indicated as "ID sorting (descending order)".

"Data sorting (ascending order)" indicates rules for processing the vehicle logs having the same ID to be sorted in order from the lowest data for a specific byte, e.g., the fourth byte. Although FIG. 6 illustrates "data sorting (ascending order)" as one example, when the logs having the same ID are sorted in order from the highest data for a specific byte, this is indicated as "data sorting (descending order)".

"Data replacement" indicates a rule for processing that replaces the entirety of a data region corresponding to a specific data type (e.g., counter and checksum) denoted in the vehicle log definition table with a specific value (e.g., 00).

Next, processing Y/N is either "yes" or "no", and indicates whether or not the rules have been applied to the corresponding processing item. When the rules have been applied to the corresponding processing item, processing Y/N is "yes", whereas when the rules have not been applied to the corresponding processing item, processing Y/N is "no".

The value before processing indicates the original value for the corresponding processing item in the vehicle log, whereas the value after processing indicates a value after processing the corresponding processing item in the vehicle log (i.e., the value in the processed vehicle log).

In FIG. 6, processing Y/N is "yes" for the processing item "time index". For the value before processing of "10:10:10", the value after processing is "T11", and for the value before processing of "10:10:20", the value after processing is "T12".

In FIG. 6, processing Y/N is "yes" for the processing items "ID sorting (ascending order)" and "data sorting (ascending order)". The value before processing and the value after processing are both "-", and "-" indicates a rule that the values are not to be replaced. This is because although the data is sorted with "ID sorting (ascending order)" and "data sorting (ascending order)", the data values themselves are not replaced.

Additionally, processing Y/N is "yes" for the processing item "data replacement" and the values before processing indicate the values of "counter" and "checksum", and this indicates a rule that the values of "counter" and "checksum" after processing are replaced with "00".

By sharing the vehicle log processing rules between vehicle log transmission device 10 and vehicle log analysis server 20, the processed vehicle log processed by vehicle log transmission device 10 can be restored to the original vehicle log by vehicle log analysis server 20. Note that when the processed vehicle log has been generated using predetermined rules and the difference generation log is generated using the predetermined rules, a time list indicating a correspondence relationship between at least the time information and the index information may be transmitted from vehicle log transmission device 10 to vehicle log analysis server 20 as the vehicle log processing rules when the predetermined rules are already held in vehicle log transmission device 10 and vehicle log analysis server 20 in advance. This is because vehicle log analysis server 20 can restore information aside from the time information using predetermined rules.

Processed Vehicle Log

FIG. 7 is a diagram illustrating an example of the processed vehicle log generated by difference log generator 150 according to Embodiment 1 of the present disclosure. FIG. 7 is an example of the processed vehicle log obtained when the vehicle log illustrated in FIG. 4 is processed according to the vehicle log processing rules illustrated in FIG. 6. In FIG. 7, the processed vehicle log is constituted by a set including a time, an ID, and 8-byte data, in the same manner as the vehicle log.

In FIG. 7, the time in the processed vehicle log has been converted to a time index (T11, T12, and so on up to T54) in accordance with the "time index" rule in the vehicle log processing rules illustrated in FIG. 6. For example, time "T11" is a time index obtained when replacing the time "10:10:10".

Furthermore, the processed vehicle log is sorted in order from the lowest ID.

The values of the data of the fourth byte in the lines with times "T53", "T13", and "T23" for the processed vehicle log having an ID of "ID 3" are "10", "20", and "30", respectively, and are sorted in order from the lowest data of the fourth byte for that same ID, in accordance with the rule "data sorting (ascending order)" in the vehicle log processing rules illustrated in FIG. 6.

According to the vehicle log definition table illustrated in FIG. 5, the first byte in the processed vehicle log is "counter", and the values of the data are all replaced with "00" according to the rule "data replacement" in the vehicle log processing rules illustrated in FIG. 6.

As described above, in the processed vehicle log, values which are highly likely to change when a vehicle log is generated, such as time, counter, checksum, event occurrence time, and the like, are converted to an index or are replaced with "00" or the like. Note that in the processed vehicle log, rounding processing may be performed to round detailed values from sensors of the like.

Difference Generation Log

The difference generation log will be described next. The difference generation log is constituted by a set of an ID and data corresponding to the ID which can arise in each vehicle state. In the difference generation log, values which are highly likely to take on the same data values as in the vehicle log are set for each ID and each vehicle state.

For example, when the vehicle state is "stopped", it is likely that the speed of vehicle 200 is 0 km and the shift state is parking.

Additionally, when the vehicle state is "cruise control mode", it is likely that the speed is a high speed greater than or equal to a predetermined speed and the shift state is drive, because that mode is often set when vehicle 200 is traveling on a highway.

Furthermore, when the vehicle state is "Japan, Osaka Pref., Osaka City", it is likely that the speed of vehicle 200 is a low speed less than or equal to a predetermined speed, because the location of vehicle 200 is an urban area with many pedestrians.

When the vehicle state is "rain, 20 degrees", it is likely that the wipers are running and the air conditioner is not running in vehicle 200.

FIG. 8 is a diagram illustrating an example of the difference generation log stored by difference generation log storage 130 according to Embodiment 1 of the present disclosure. In FIG. 8, the difference generation log has numbers assigned to each vehicle state, and is constituted by sets of IDs and 8-byte data. As with the vehicle log, what the data value of each byte in the difference generation log represents is found by referring to the vehicle log definition table.

In FIG. 8, the difference generation log having the number "1" is a difference generation log in which the vehicle state is "stopped". In the second set, the ID is "ID 2", the value of counter in the first byte is "00", the value of checksum in the second byte is "00", the values of speed in the third and fourth bytes are "00" and "00", and the value of shift in the fifth byte is "parking", indicated by "00".

The difference generation log having the number "2" is a difference generation log in which the vehicle state is "cruise control mode". In the second set, the ID is "ID 2", the value of counter in the first byte is "00", the value of checksum in the second byte is "00", the values of speed in the third and fourth bytes are "20" and "10", and the value of shift in the fifth byte is "drive", indicated by "01".

The difference generation log having the number "3" is a difference generation log in which the vehicle state is "Japan, Osaka Pref., Osaka City". In the fourth set, the ID is "ID 4", the value of counter in the first byte is "00", the value of vehicle state in the second byte is "02", indicating "Japan, Osaka Pref., Osaka City", the values of location information in the third and fourth bytes are "87" and "34", the value of wipers in the fifth byte is "00", indicating not running, and the value of air conditioner in the sixth byte is "00", indicating not running.

The difference generation log having the number "4" is a difference generation log in which the vehicle state is "rain, 20 degrees". In the fourth set, the ID is "ID 4", the value of counter in the first byte is "00", the value of vehicle state in the second byte is "03", indicating "rain, 20 degrees", the values of location information in the third and fourth bytes are "00" and "00", the value of wipers in the fifth byte is "01", indicating running, and the value of air conditioner in the sixth byte is "00", indicating not running.

Difference Log

The difference log will be described in detail next. Difference log generator 150 generates the difference log from the processed vehicle log using the difference generation log. The difference log is generated so as to reduce differences from the difference generation log. This is because as the difference decreases, the data compression rate of the difference log increases, which makes it possible to reduce the amount of communication. Based on the vehicle state of vehicle 200, the difference generation log of the corresponding vehicle state is used to generate the difference log.

FIG. 9 is a diagram illustrating an example of the difference log generated by difference log generator 150 according to Embodiment 1 of the present disclosure.

In FIG. 9, the difference log is constituted by a set including a time, an ID, and 8-byte data, in the same manner as the processed vehicle log. In FIG. 9, the difference log is a difference log generated using the processed vehicle log illustrated in FIG. 7 and the difference generation log illustrated in FIG. 8. In FIG. 7, the vehicle state in the second byte of the processed vehicle log having an ID of "ID 4" is "01", indicating cruise control mode. Accordingly, the difference generation log for cruise control mode, for which the difference generation log number is "2", is used to generate the difference log.

The difference log is a result of performing an exclusive OR operation using the value of each single byte corresponding to the ID of the processed vehicle log and the value of each single byte of the data in the difference generation log having the same ID value.

An exclusive OR operation is used to generate the difference log in this manner because when restoring the processed vehicle log on the vehicle log analysis server 20 side using the difference log and the difference generation log, vehicle log analysis server 20 also performs an exclusive OR operation using the value of each single byte corresponding to the ID of the difference log and the value of each single byte corresponding to the data in the difference generation log.

In FIG. 9, the data from the first to eighth bytes is "00" for the ID "ID 1" at the time "T11" in the difference log. In FIG. 7, for the ID "ID 1" at the time "T11" in the processed vehicle log, the first byte is "00", the second byte is "50", the third byte is "40", and the fourth to eighth bytes are "30", and for the ID "ID 1" in the difference generation log having a difference generation log number of "2" in FIG. 8, the first byte is "00", the second byte is "50", the third byte is "40", and the fourth to eighth bytes are "30". As such, the values resulting from an exclusive OR operation on these values are "00" for the first to eighth bytes.

For the ID "ID 1" at time "T11" in the difference log, the first to eighth bytes are "00"; for the ID "ID 1" of the difference generation log having a difference generation log number of "2", the first byte is "00", the second byte is "50", the third byte is "40", and the fourth to eighth bytes are "30". The values resulting from the exclusive OR operation performed on these values in the difference log and the difference generation log are, for ID "ID 1" at time "T11" in the processed vehicle log, "00" for the first byte, "50" for the second byte, "40" for the third byte, and "30" for the fourth to eighth bytes, and thus the processed vehicle log can be restored from the difference log.

In FIG. 9, for the ID "ID 2" at time "T22" in the difference log, the data is "00" for the first to third bytes and the fifth to eighth bytes, and only the fourth byte is "10". In FIG. 7, for the ID "ID 2" at time "T22" in the processed vehicle log, the first, second, and sixth to eighth bytes are "00", the third and fourth bytes, which indicate speed, are "20" and "00", and the fifth byte, indicating shift, is "01". For the ID "ID 2" in the difference generation log having a difference generation log number of "2" in FIG. 8, the first, second, and sixth to eighth bytes are "00", the third and fourth bytes are "20" and "10", and the fifth byte is "01". As such, the values resulting from an exclusive OR operation on these values are "00" for the first to third bytes and the fifth to eighth bytes, and "10" for the fourth byte.

For the ID "ID 2" at time "T22" in the difference log, the first to third and fifth to eighth bytes are "00", and the fourth byte is "10"; for the ID "ID 2" of the difference generation log having a difference generation log number of "2", the first, second, and sixth to eighth bytes are "00", the third and fourth bytes are "20" and "10", and the fifth bytes is "01". The values resulting from the exclusive OR operation performed on these values in the difference log and the difference generation log are, for ID "ID 2" at time "T22" in the processed vehicle log, "00" for the first to third and fifth to eighth bytes and "10" for the fourth byte, and thus the processed vehicle log can be restored from the difference log.

Difference Log Transmission Processing Sequence

Processing through which vehicle log transmission device 10 generates and transmits the difference log will be described next.

Figure 10:
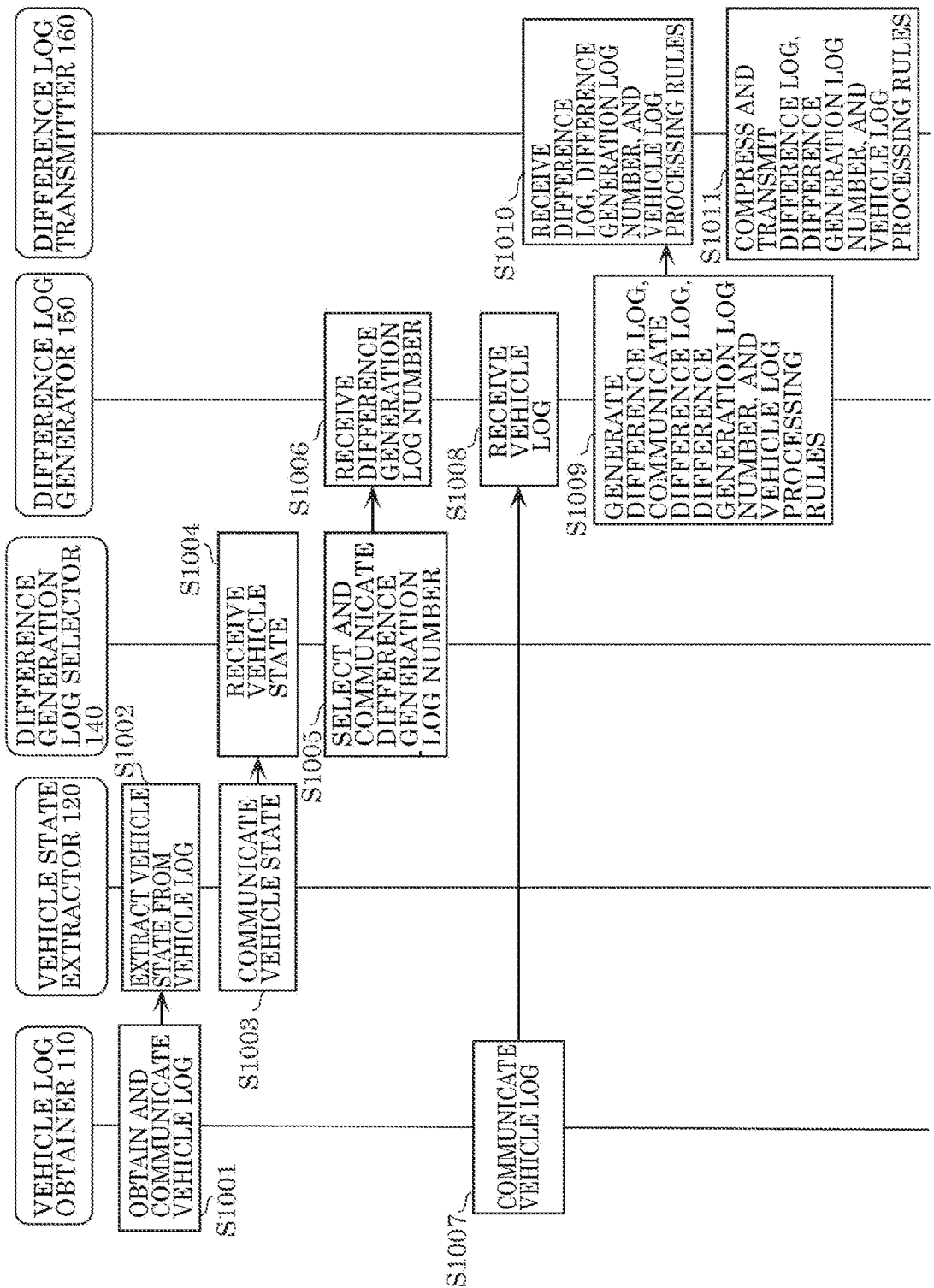
FIG. 10 is a diagram illustrating a sequence in difference log transmission processing according to Embodiment 1 of the present disclosure.

FIG. 10 is a diagram illustrating a processing sequence through which vehicle log transmission device 10 generates and transmits the difference log according to Embodiment 1 of the present disclosure.

(S1001) Vehicle log obtainer 110 of vehicle log transmission device 10 obtains the vehicle log and communicates the vehicle log to vehicle state extractor 120.

(S1002) Vehicle state extractor 120 receives the vehicle log, refers to the vehicle log definition table, and extracts the vehicle state from the vehicle log.

(S1003) Vehicle state extractor 120 communicates the extracted vehicle state to difference generation log selector 140.

(S1004) Difference generation log selector 140 receives the vehicle state.

(S1005) Difference generation log selector 140 selects the difference generation log corresponding to the received vehicle state, and communicates the number of the selected difference generation log to difference log generator 150.

(S1006) Difference log generator 150 receives the number of the difference generation log and obtains the difference generation log corresponding to the number of the difference generation log from difference generation log storage 130.

(S1007) Vehicle log obtainer 110 communicates the vehicle log to difference log generator 150.

(S1008) Difference log generator 150 receives the communicated vehicle log.

(S1009) Difference log generator 150 generates the processed vehicle log from the received vehicle log. The rules used when generating the processed vehicle log are taken as the vehicle log processing rules. Furthermore, difference log generator 150 generates the difference log using the processed vehicle log and the difference generation log, and communicates the difference log, the number of the difference generation log, and the vehicle log processing rule to difference log transmitter 160.

(S1010) Difference log transmitter 160 receives the communicated difference log, difference generation log number, and vehicle log processing rules.

(S1011) Difference log transmitter 160 compresses the received difference log, and transmits the compressed difference log, the difference generation log number, and the vehicle log processing rules to vehicle log analysis server 20.

Difference Log Reception Processing Sequence

Processing through which vehicle log analysis server 20 receives the difference log and performs anomaly detection processing will be described next.

Figure 11:
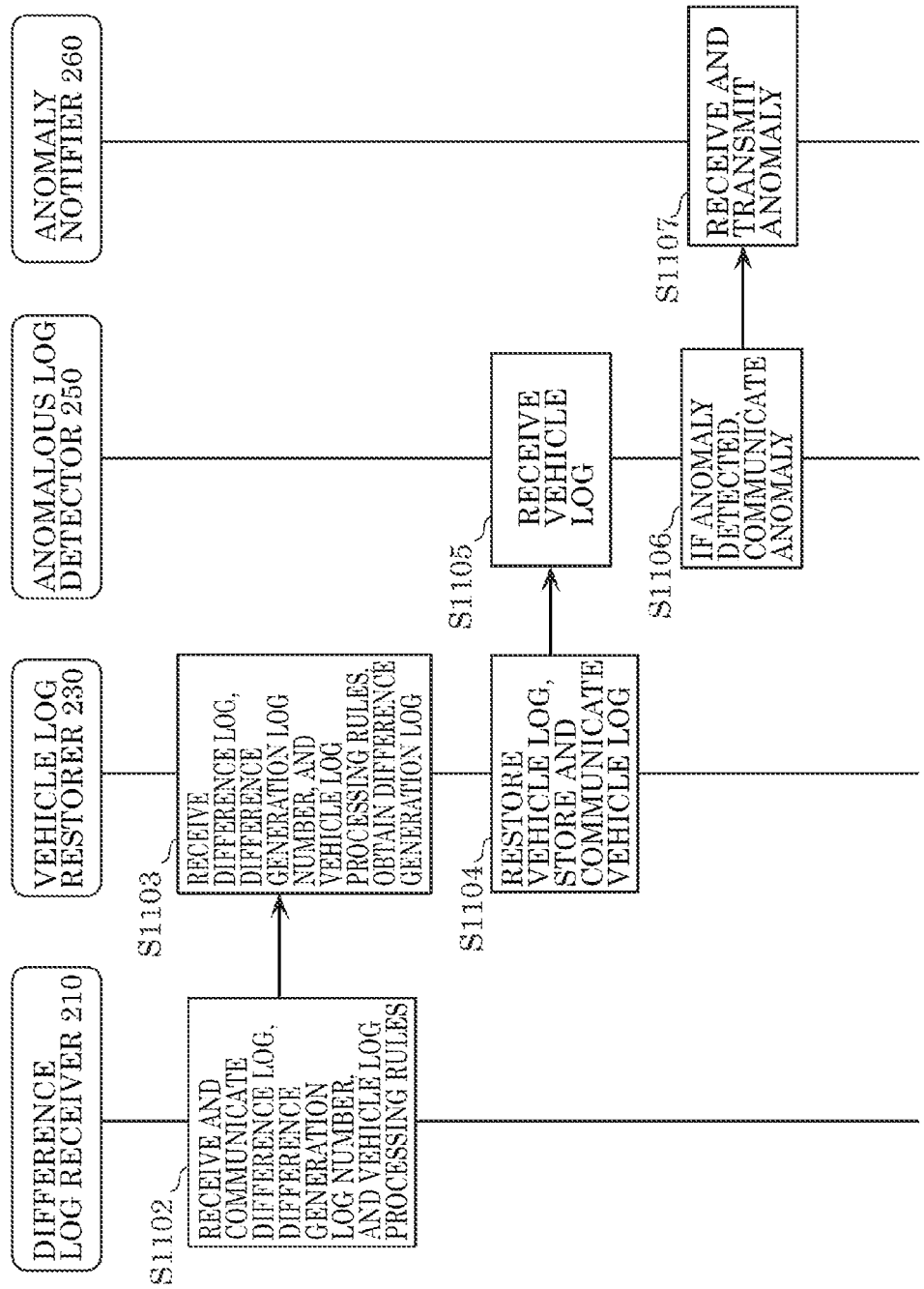
FIG. 11 is a diagram illustrating a sequence in difference log reception processing according to Embodiment 1 of the present disclosure.

FIG. 11 is a diagram illustrating a processing sequence through which vehicle log analysis server 20 receives the difference log according to Embodiment 1 of the present disclosure.

(S1102) Difference log receiver 210 receives the compressed difference log, the difference generation log number, and the vehicle log processing rules, decompresses the compressed difference log, and communicates the decompressed difference log, the difference generation log number, and the vehicle log processing rules to vehicle log restorer 230.

(S1103) Vehicle log restorer 230 receives the communicated difference log, difference generation log number, and vehicle log processing rules, and obtains the difference generation log corresponding to the number of the difference generation log from restoration log storage 220.

(S1104) Vehicle log restorer 230 restores the vehicle log from the difference log and the difference generation log, stores the vehicle log in vehicle log storage 240, and communicates the vehicle log to anomalous log detector 250.

(S1105) Anomalous log detector 250 receives the communicated vehicle log.

(S1106) Anomalous log detector 250 detects whether or not the received vehicle log contains an anomaly, and when the vehicle log contains an anomaly, communicates the anomaly to anomaly notifier 260.

(S1107) Anomaly notifier 260 receives the communicated anomaly, and communicates the anomaly to a user of vehicle log analysis server 20 or the driver of vehicle 200 in which the anomalous vehicle log was generated.

Flowchart of Processed Vehicle Log Generation Processing

Processing through which difference log generator 150 generates the processed vehicle log from the vehicle log according to the rules will be described next. The rules are settings made by a user of vehicle log analysis system 100, a user of vehicle 200, or the like, for example.

Figure 12:
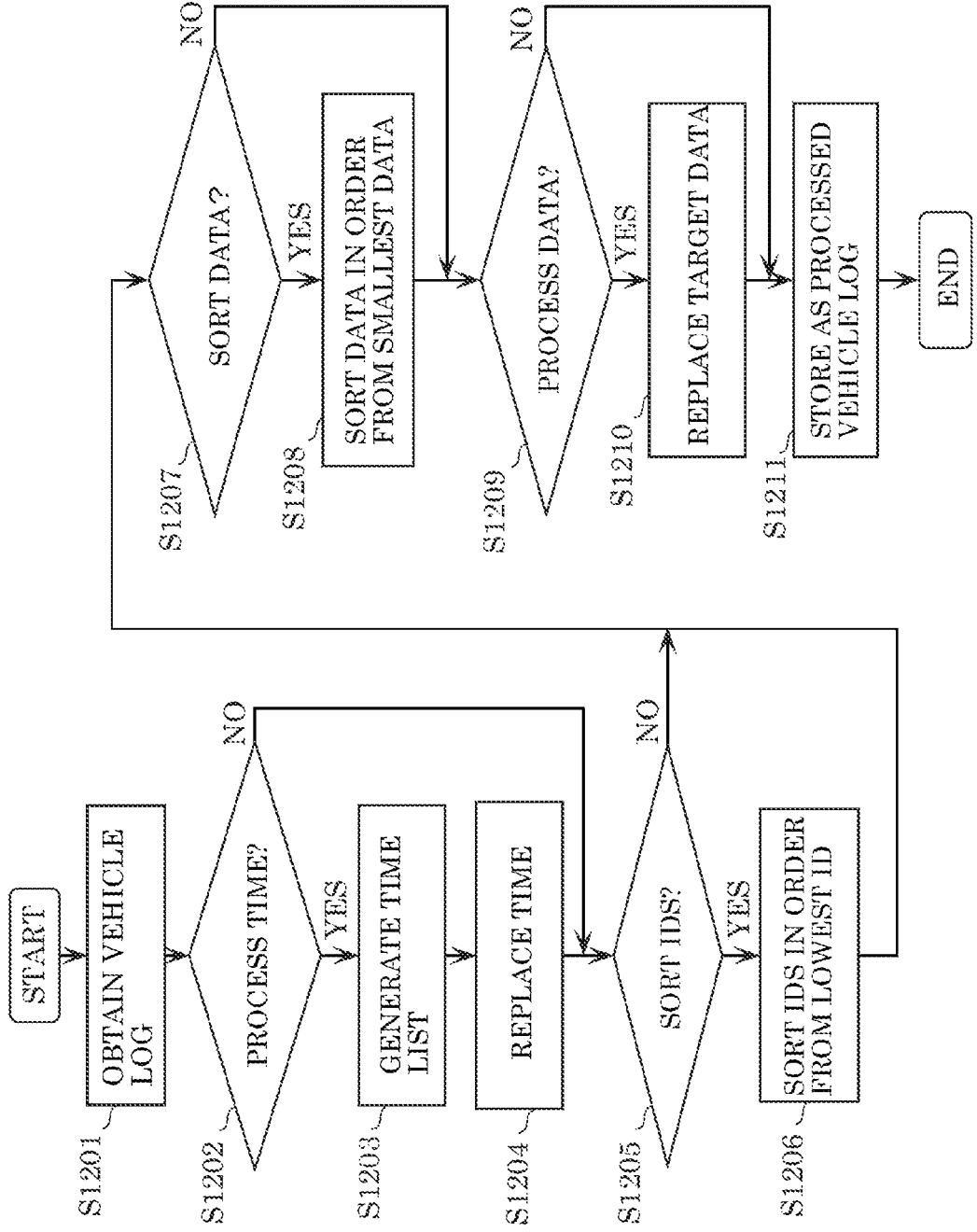
FIG. 12 is a flowchart illustrating vehicle log processing according to Embodiment 1 of the present disclosure.

FIG. 12 is a flowchart illustrating the processed vehicle log generation processing performed by difference log generator 150 according to Embodiment 1 of the present disclosure.

(S1201) Difference log generator 150 obtains the vehicle log from vehicle log obtainer 110.

(S1202) Difference log generator 150 determines whether or not to process the "time" in the vehicle log in accordance with the rules. When difference log generator 150 determines that the "time" in the vehicle log is to be processed (YES), the processing of step S1203 is performed. When difference log generator 150 determines that the "time" in the vehicle log is not to be processed (NO), the vehicle log processing rules are generated with the processing item being "time index" and processing Y/N being "no". Difference log generator 150 then performs the processing of step S1205.

(S1203) Difference log generator 150 generates a time list with the processing item being "time index", processing Y/N being "yes", the time of the vehicle log being the value before processing, and the serial numbers of the time index being the value after processing.

When difference log generator 150 determines that the "time" in the vehicle log is to be processed, this means, for example, that the stated rule is a rule (a setting) that the "time" in the vehicle log is to be processed. Additionally, when difference log generator 150 determines that the "time" in the vehicle log is not to be processed, this means, for example, that the stated rule is a rule (a setting) that the "time" in the vehicle log is not to be processed. The vehicle log processing rules generated in step S1203 correspond to the "time index" line in FIG. 6, and these vehicle log processing rules are an example of the time list indicating the correspondence relationship between the time information and the index information. From this time list, it can be seen, for example, that the time "10:10:10" and the time index "T11" correspond.

(S1204) Difference log generator 150 refers to the value before processing and the value after processing in the time list, and replaces the time in the vehicle log with the serial numbers of the time index, which is the value after processing.

(S1205) Difference log generator 150 determines whether or not to sort the "ID" in the vehicle log in order from the lowest ID in accordance with the rules. When difference log generator 150 determines to sort the "ID" in the vehicle log (YES), the vehicle log processing rules are generated with the processing item being "ID sorting (ascending order)", processing Y/N being "yes", the value before processing being "-", and the value after processing being "-". Difference log generator 150 then performs the processing of step S1206. When difference log generator 150 determines not to sort the "ID" in the vehicle log (NO), the vehicle log processing rules are generated with the processing item being "ID sorting (ascending order)" and processing Y/N being "no". Difference log generator 150 then performs the processing of step S1207.

When difference log generator 150 determines to sort the "ID" in the vehicle log, this means, for example, that the stated rule is a rule (a setting) that the "ID" in the vehicle log is to be sorted. Additionally, when difference log generator 150 determines to not sort the "ID" in the vehicle log, this means, for example, that the stated rule is a rule (a setting) that the "ID" in the vehicle log is not to be sorted. The vehicle log processing rules generated after the determination in step S1205 correspond to the line for "ID sorting (ascending order)" in FIG. 6.

(S1206) Difference log generator 150 sorts the vehicle logs in order from the lowest ID.

(S1207) Difference log generator 150 determines whether or not to sort the "data" in the vehicle log in order from the smallest data in accordance with the rules. When difference log generator 150 determines to sort the "data" in the vehicle log (YES), the vehicle log processing rules are generated with the processing item being "data sorting (ascending order)", processing Y/N being "yes", the value before processing being "-", and the value after processing being "-". Difference log generator 150 then performs the processing of step S1208. When difference log generator 150 determines not to sort the "data" in the vehicle log (NO), the vehicle log processing rules are generated with the processing item being "data sorting (ascending order)" and processing Y/N being "no". Difference log generator 150 then performs the processing of step S1209.

When difference log generator 150 determines to sort the "data" in the vehicle log, this means, for example, that the stated rule is a rule (a setting) that the "data" in the vehicle log is to be sorted. Additionally, when difference log generator 150 determines to not sort the "data" in the vehicle log, this means, for example, that the stated rule is a rule (a setting) that the "data" in the vehicle log is not to be sorted. The vehicle log processing rules generated after the determination in step S1207 correspond to the line for "data sorting (ascending order)" in FIG. 6.

(S1208) Difference log generator 150 sorts the vehicle logs in order from the smallest data.

(S1209) Difference log generator 150 determines whether or not to process predetermined "data" in the vehicle log in accordance with the rules. When difference log generator 150 determines to process the predetermined "data" in the vehicle log (YES), the vehicle log processing rules are generated with the processing item being "data replacement", processing Y/N being "yes", the value before processing being "counter", the value after processing being "00", the value before processing being "checksum", and the value after processing being "00". Difference log generator 150 then performs the processing of step S1210. When difference log generator 150 determines not to process the predetermined "data" in the vehicle log (NO), the vehicle log processing rules are generated with the processing item being "data replacement" and processing Y/N being "no". Difference log generator 150 then performs the processing of step S1211.

When difference log generator 150 determines to process the predetermined "data" in the vehicle log, this means, for example, that the stated rule is a rule (a setting) that the predetermined "data" in the vehicle log is to be processed. Additionally, when difference log generator 150 determines not to process the predetermined "data" in the vehicle log, this means, for example, that the stated rule is a rule (a setting) that the predetermined "data" in the vehicle log is not to be processed. The vehicle log processing rules generated after the determination in step S1209 correspond to the line for "data replacement" in FIG. 6.

(S1210) Difference log generator 150 replaces the value of counter with "00" and the value of checksum with "00" in the vehicle log.

(S1211) Difference log generator 150 stores the processed vehicle log obtained by processing the vehicle log.

Flowchart of Difference Log Generation Processing

Processing through which vehicle log transmission device 10 generates the difference log from the processed vehicle log using the difference generation log will be described next. FIG. 13 is a flowchart illustrating the difference log generation processing performed by vehicle log transmission device 10 according to Embodiment 1 of the present disclosure.

(S1301) Vehicle state extractor 120 of vehicle log transmission device 10 obtains the vehicle state from the obtained vehicle log. Vehicle state extractor 120 communicates the obtained vehicle state to difference generation log selector 140.

(S1302) Difference generation log selector 140 determines what state the communicated vehicle state is. Difference generation log selector 140 performs the processing of step S1303 when the vehicle state is "stopped", performs step S1304 when the vehicle state is "cruise control mode", performs step S1305 when the vehicle state is "Japan, Osaka Pref., Osaka City", and performs step S1306 when the vehicle state is "rain, 20 degrees".

(S1303) Difference generation log selector 140 selects the difference generation log of "stopped", having the difference generation log number of "1", from difference generation log storage 130. Difference generation log selector 140 communicates the number of the selected difference generation log to difference log generator 150.

(S1304) Difference generation log selector 140 selects the difference generation log of "cruise control mode", having the difference generation log number of "2", from difference generation log storage 130. Difference generation log selector 140 communicates the number of the selected difference generation log to difference log generator 150.

(S1305) Difference generation log selector 140 selects the difference generation log of "Japan, Osaka Pref., Osaka City", having the difference generation log number of "3", from difference generation log storage 130. Difference generation log selector 140 communicates the number of the selected difference generation log to difference log generator 150.

(S1306) Difference generation log selector 140 selects the difference generation log of "rain, 20 degrees", having the difference generation log number of "4", from difference generation log storage 130. Difference generation log selector 140 communicates the number of the selected difference generation log to difference log generator 150.

(S1307) Difference log generator 150 generates the processed vehicle log by processing the vehicle log, and generates the difference log by calculating, for each ID, a difference between the processed vehicle log and the difference generation log corresponding to the number of the difference generation log which has been communicated.

Flowchart of Vehicle Log Restoration Processing

Processing through which vehicle log analysis server 20 restores the difference log, transmitted from vehicle log transmission device 10, into the vehicle log will be described next.

FIG. 14 is a flowchart illustrating the vehicle log restoration processing performed by vehicle log restorer 230 according to Embodiment 1 of the present disclosure.

(S1401) Vehicle log restorer 230 obtains the difference log and the vehicle log processing rules from difference log receiver 210, and furthermore obtains the difference generation log from restoration log storage 220.

(S1402) Vehicle log restorer 230 performs an exclusive OR operation on the difference log and the difference generation log, and restores the processed vehicle log.

(S1403) Vehicle log restorer 230 determines whether or not processing Y/N is "yes" for the processing item "time index" in the vehicle log processing rules. When vehicle log restorer 230 determines that this is "yes" (YES), the processing of step S1404 is performed, whereas when vehicle log restorer 230 determines that this is "no" (NO), the processing of step S1405 is performed.

(S1404) If the time (time index) in the processed vehicle log matches the value after processing for the processing item "time index" in the vehicle log processing rules, vehicle log restorer 230 replaces the time in the processed vehicle log with the value before processing for the processing item "time index" in the vehicle log processing rules.

(S1405) Vehicle log restorer 230 sorts the processed vehicle log in order by the earliest time.

(S1406) Vehicle log restorer 230 stores the processed vehicle log obtained after the processing of steps S1403 to S1405 has been performed as the vehicle log.

OTHER EMBODIMENTS

As described thus far, Embodiment 1 has been given as an example of the technique according to the present disclosure. However, the technique in the present disclosure is not limited thereto, and can also be applied in embodiments in which modifications, replacements, additions, or omissions have been made as appropriate. For example, variations such as those described below are also included in the embodiments of the present disclosure.

(1) Although the foregoing embodiment is described as a security measure taken in a vehicle such as an automobile, the present disclosure is not limited to this application. The present disclosure is not limited to automobiles, and can be applied in mobility devices such as construction equipment, agricultural equipment, ships, rail cars, aircraft, and the like.

(2) Although the foregoing embodiment describes vehicle log analysis server 20 as including anomalous log detector 250 and anomaly notifier 260, anomalous log detector 250 and anomaly notifier 260 are not required constituent elements. When vehicle log analysis server 20 does not include anomalous log detector 250 and anomaly notifier 260, for example, collected vehicle logs may be analyzed manually, and evidence of an attack may be detected as an anomaly.

(3) Although the foregoing embodiment describes vehicle log transmission device 10 as being installed within a vehicle, vehicle log transmission device 10 may be an edge server that transmits a plurality of vehicle logs together, or may be a cloud server that collects vehicle logs.

(4) Although the foregoing embodiment describes the vehicle log as being an ECU system operation log or a CAN, CAN-FD, Ethernet, or FlexRay network log, the ECU may be an WI (In-Vehicle Infotainment System) or a sensor device, the network may be LIN, MOST, or the like, and the configuration may be such that these are combined.

(5) Although the foregoing embodiment describes difference log generator 150 as calculating the difference log using an exclusive OR operation, the difference log may be generated using another difference generation algorithm such as Binary Duff.

(6) Although the foregoing embodiment describes difference log generator 150 as calculating a difference of a data region of the vehicle log from the difference generation log using an exclusive OR operation, a difference of an ID region of the vehicle log from the difference generation log may also be calculated using an exclusive OR operation. If the difference of the ID region is also calculated using an exclusive OR operation, vehicle log restorer 230 will become unable to identify the ID. Accordingly, difference log generator 150 adds information making it possible to identify the ID to the time index included in the vehicle log processing rules, and vehicle log restorer 230 can identify the ID and restore the vehicle log by referring to the time index. This makes it possible to further reduce the difference between the vehicle log and the difference generation log.

(7) Although the foregoing embodiment describes difference log transmitter 160 as compressing the difference log using a compression algorithm such as LHA or ZIP, the compression may be performed using another compression algorithm such as 7z, RAR, AFA, CAB, GCA, DGCA, StuffIt, Compact Pro, pack, compress, bzip, bzip2, or Zstandard.

(8) Although the foregoing embodiment describes difference log generator 150 as using the difference generation log to perform the exclusive OR operation, the difference generation log may be used as a compression dictionary utilized by the compression algorithm. When the difference generation log is used as a compression dictionary, difference log generator 150 does not absolutely have to calculate the difference between the vehicle log and the difference generation log, and may select a compression dictionary likely to be capable of better compression in accordance with the vehicle state.

It is generally known that compression rates can be improved by using data resembling the data to be compressed as a compression dictionary. For example, when the data included in a compression dictionary is divided into units of N bytes and the divided data of every N bytes is associated with an identifier of the divided data, if the data to be compressed is divided into units of N bytes and the divided data to be compressed matches the divided data in the compression dictionary, the data can be replaced with the identifier of the divided data.

In other words, if the data is similar, much of the divided data can be replaced with identifiers, which makes efficient data compression possible.

(9) Although the foregoing embodiment describes the difference generation log as being shared between vehicle log transmission device 10 and vehicle log analysis server 20 in advance, the difference generation log may be shared dynamically between vehicle log transmission device 10 and vehicle log analysis server 20. For example, the vehicle log transmitted from vehicle log transmission device 10 to vehicle log analysis server 20, and the vehicle state at the time of that transmission, may be stored in difference generation log storage 130 and restoration log storage 220 as the difference generation log. In this case, it is not absolutely necessary for difference generation log storage 130 and restoration log storage 220 to store the difference generation log for each ID.

When the difference generation log is not stored for each ID, difference log generator 150 generates the difference log by calculating a difference between each line of the processed vehicle log to be transmitted and the difference generation log, in order from the first line, and vehicle log restorer 230 then restores the vehicle log by calculating the difference between each line of the difference log and the difference generation log in order from the first line. This makes it unnecessary to set the difference generation log for each vehicle state in advance, which suppresses development costs.

Additionally, when difference generation log storage 130 and restoration log storage 220 do not store the difference generation log for each ID, difference log generator 150 may delete lines in the difference generation log from the last line so as to have the same number of lines or data size as the processed vehicle log to be transmitted. In this case, in the vehicle log processing rules, "difference generation log deletion" is denoted for "processing item", "yes" for "processing Y/N", the deleted number of lines or data size for "value before processing", and "-" for "value after processing". The difference log may be generated by calculating a difference between each line of the processed vehicle log to be transmitted and the difference generation log, in order from the first line; vehicle log restorer 230 may then refer to the vehicle log processing rules, and when "processing Y/N" is "yes" for "difference generation log deletion", the number of lines or the equivalent data size may be deleted from the last line in the difference generation log, and the vehicle log may be restored by calculating the difference between each line of the difference log and the difference generation log in order from the first line.

Additionally, when difference generation log storage 130 and restoration log storage 220 do not store the difference generation log for each ID, difference log generator 150 may delete lines in the difference generation log from the first line in such a manner that the ID included in the first line of the difference generation log matches the ID included in the first line of the processed vehicle log to be transmitted or a predetermined ID. In this case, in the vehicle log processing rules, "difference generation log ID matching" is denoted for "processing item", "yes" for "processing Y/N", the deleted number of lines for "value before processing", and "-" for "value after processing". The difference log may be generated by calculating a difference between each line of the processed vehicle log to be transmitted and the difference generation log, in order from the first line; vehicle log restorer 230 may then refer to the vehicle log processing rules, and when "processing Y/N" is "yes" for "difference generation log ID matching", the number of lines denoted in the vehicle log processing rules may be deleted from the first line in the difference generation log, and the vehicle log may be restored by calculating the difference between each line of the difference log and the difference generation log in order from the first line.

Additionally, difference generation log storage 130 and restoration log storage 220 may store the difference generation log dynamically for each ID. When a plurality of one-line logs having the same ID are present in the vehicle log, the average value of each first line or byte, a median value of each byte, or a most frequently-appearing value for each byte, among the one-line logs having the same ID, may be employed and stored for each ID.

(10) Although the foregoing embodiment describes anomaly notifier 260 as notifying a user of vehicle log analysis server 20 or the driver of an anomaly, the notification target may be the police, the Ministry of Transport, or organizations that share vulnerability information.

(11) Although the foregoing embodiment describes the processed vehicle log as including times or a time index and the data as being replaced with predetermined values, this may be limited to information necessary for anomalous log detector 250 to detect an anomalous log. For example, when anomalous log detector 250 detects a situation where a value in a specific data region is greater than or equal to a predetermined value as an anomaly, time information, detailed data, and so on is not necessary, and the vehicle log may be subjected to processing for deleting the time information, rounding the data, and so on. Additionally, when anomalous log detector 250 detects an anomaly using machine learning, a feature amount such as time-series difference information used in the machine learning may be used as the data of the processed vehicle log.

(12) The foregoing embodiment describes the vehicle log processing rules as being created when difference log generator 150 generates the difference log from the vehicle log and shared between vehicle log transmission device 10 and vehicle log analysis server 20, but in lines of the vehicle log processing rules where the processing item is "ID sorting (ascending order)", "data sorting (ascending order)", or "data replacement", "processing Y/N", "value before processing", and "value after processing" may be shared in advance, rather than when the difference log is generated. However, "value before processing" and "value after processing" cannot be shared when the processing item is "time index", and it is therefore necessary to create these when difference log generator 150 generates the difference log and dynamically share with vehicle log analysis server 20.

(13) Some or all of the constituent elements constituting the devices in the foregoing embodiment may be implemented by a single integrated circuit through system LSI (Large-Scale Integration). "System LSI" refers to very-large-scale integration in which multiple constituent elements are integrated on a single chip, and specifically, refers to a computer system configured including a microprocessor, ROM, RAM, and the like. A computer program is recorded in the RAM. The system LSI circuit realizes the functions of the constituent elements by the microprocessor operating in accordance with the computer program. The units of the constituent elements constituting the foregoing devices may be implemented individually as single chips, or may be implemented with a single chip including some or all of the devices. Although the term "system LSI" is used here, other names, such as IC, LSI, super LSI, ultra LSI, and so on may be used, depending on the level of integration. Furthermore, the method for implementing the integrated circuit is not limited to LSI; the circuit may be implemented through a dedicated circuit, a generic processor, or the like. An FPGA (Field Programmable Gate Array) capable of post-production programming or a reconfigurable processor in which the connections and settings of the circuit cells within the LSI can be reconfigured may be used as well. Furthermore, should technology for implementing integrated circuits that can replace LSI appear due to advancements in semiconductor technology or the appearance of different technologies, the integration of the above function blocks may be performed using such technology. Biotechnology applications are one such foreseeable example.

(14) Some or all of the constituent elements constituting the foregoing devices may be constituted by IC cards or stand-alone modules that can be removed from and mounted in the apparatus. The IC card or module is a computer system constituted by a microprocessor, ROM, RAM, and the like. The IC card or module may include the above very-large-scale integration LSI circuit. The IC card or module realizes the functions thereof by the microprocessor operating in accordance with the computer program. The IC card or module may be tamper-resistant.

(15) The present disclosure can be implemented not only as vehicle log transmission device 10 and vehicle log analysis system 100, but also as a vehicle log transmission/reception method including steps of the processing performed by the elements constituting vehicle log analysis system 100.

Specifically, the method includes a vehicle log transmitting method performed by vehicle log transmission device 10 and a vehicle log receiving method performed by vehicle log analysis server 20. The vehicle log transmission/reception method transmits a vehicle log from vehicle log transmission device 10 to vehicle log analysis server 20. Vehicle log transmission device 10 includes difference generation log storage 130 that stores a list of difference generation logs, each difference generation log being a vehicle log for each of vehicle states shared between vehicle log transmission device 10 and vehicle log analysis server 20. Vehicle log analysis server 20 includes restoration log storage 220 that stores the list. As illustrated in FIG. 10, the vehicle log transmitting method includes: obtaining the vehicle log (step S1001); extracting a vehicle state from the obtained vehicle log (step S1002); selecting a difference generation log from the list in accordance with the extracted vehicle state (step S1005); generating a difference log based on the obtained vehicle log and the selected difference generation log (step S1009); and transmitting, to vehicle log analysis server 20, the generated difference log and a difference generation log identifier corresponding to the selected difference generation log (step S1011). As illustrated in FIG. 11, the vehicle log receiving method includes: receiving the difference log and the difference generation log identifier transmitted in the transmitting (step S1102); and specifying the difference generation log used to generate the difference log from the difference generation log identifier and the list, and restoring the vehicle log based on the difference log and the specified difference generation log (steps S1103 and S1104).

(16) As one aspect of the present disclosure, the vehicle log transmission/reception method may be a program (a computer program) that implements these methods on a computer, or a digital signal constituting the computer program. Additionally, one aspect of the present disclosure may be computer programs or digital signals recorded in a computer-readable recording medium such as a flexible disk, hard disk, CD-ROM, MO, DVD, DVD-ROM, DVD-RAM, BD (Blu-ray (registered trademark) Disc), semiconductor memory, or the like. The constituent elements may also be the digital signals recorded in such a recording medium. Additionally, one aspect of the present disclosure may be realized by transmitting the computer program or digital signal via a telecommunication line, a wireless or wired communication line, a network such as the Internet, a data broadcast, or the like. Additionally, one aspect of the present disclosure may be a computer system including a microprocessor and memory, where the memory records the above-described computer program and the microprocessor operates in accordance with the computer program. Additionally, the present disclosure may be implemented by another independent computer system, by recording the program or the digital signal in the recording medium and transferring the recording medium, or by transferring the program or the digital signal over the network or the like.

(17) Aspects realized by combining the constituent elements and functions described in the foregoing embodiment and variations as desired are also included in the scope of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

According to the in-vehicle network system and vehicle log analysis system of the present disclosure, the amount of data in a vehicle log transmitted between a vehicle and a server outside the vehicle can be reduced. As a result, a vehicle network log can be transmitted to an external server without preparing resources which enable large vehicle network logs to be communicated. This makes it possible to detect the unauthorized data infiltrating the vehicle network using a server outside the vehicle, and can therefore contribute to automobile safety.

What is claimed is:

1. A vehicle log transmission device that transmits a vehicle log to a vehicle log analysis server, the vehicle log transmission device comprising:
a vehicle log obtainer that obtains the vehicle log;
a vehicle state extractor that extracts a vehicle state from the obtained vehicle log;
difference generation log storage that stores a list of difference generation logs, each difference generation log being a vehicle log for each of vehicle states shared between the vehicle log transmission device and the vehicle log analysis server;
a difference generation log selector that selects a difference generation log from the list in accordance with the extracted vehicle state;
a difference log generator that generates a difference log based on the obtained vehicle log and the selected difference generation log; and
a difference log transmitter that transmits, to the vehicle log analysis server, the generated difference log and a difference generation log identifier corresponding to the selected difference generation log.

2. The vehicle log transmission device according to claim 1,
wherein the difference generation log storage stores the list of the difference generation logs in each of which a vehicle log previously transmitted to the vehicle log analysis server is associated with a vehicle state at a time of the transmitting.

3. The vehicle log transmission device according to claim 1,
wherein the vehicle log includes a plurality of pieces of data respectively associated with IDs indicating a data type,
the difference generation log storage stores the list of the difference generation logs both for each of IDs included in the vehicle log and each of vehicle states,
the difference generation log selector selects the difference generation log for each ID from the list in accordance with the extracted vehicle state, and
the difference log generator generates the difference log for each ID included in the obtained vehicle log, based on data associated with the ID and the selected difference generation log corresponding to the ID.

4. The vehicle log transmission device according to claim 1,
wherein the vehicle log includes a plurality of pieces of data respectively associated with IDs indicating a data type, the plurality of pieces of data being arranged in such a manner that a plurality of IDs starting with a predetermined ID repeat in a cyclical manner, and
the difference generation log selector selects the difference generation log corresponding to the plurality of IDs starting with the predetermined ID from the list in accordance with the extracted vehicle state.

5. The vehicle log transmission device according to claim 1,
wherein the difference generation log storage stores the list of the difference generation logs which have been subjected to replacement processing for replacing a value of data with a predetermined value or rounding processing for rounding a value of data, and
the difference log generator further generates the difference log after subjecting the obtained vehicle log to the replacement processing or the rounding processing.

6. The vehicle log transmission device according to claim 1,
wherein the vehicle log includes a plurality of pieces of data respectively associated with time information,
the difference generation log storage stores the list of the difference generation logs in which the time information has been replaced with index information,
the difference log generator further generates the difference log after replacing the time information included in the obtained vehicle log with the index information, and
the difference log transmitter further transmits, to the vehicle log analysis server, a time list expressing a correspondence relationship between the time information and the index information.

7. The vehicle log transmission device according to claim 6,
wherein the vehicle log includes the plurality of pieces of data respectively associated with IDs indicating a data type,
the difference generation log storage stores the list of the difference generation logs sorted by a magnitude of a value of the ID, with difference generation logs having the same ID being sorted by data size, and
the difference log generator further generates the difference log after replacing the time information with index information for the obtained vehicle log and sorting the difference generation logs by the magnitude of the value of the ID, with difference generation logs having the same ID being sorted by data size.

8. The vehicle log transmission device according to claim 1,
wherein the difference log generator uses the selected difference generation log as a data compression dictionary, compresses the obtained vehicle log according to a predetermined compression algorithm, and generates the compressed vehicle log as the difference log.

9. A vehicle log analysis system comprising:
a vehicle log transmission device; and
a vehicle log analysis server,
wherein the vehicle log analysis system transmits a vehicle log from the vehicle log transmission device to the vehicle log analysis server,
the vehicle log transmission device includes:
a vehicle log obtainer that obtains the vehicle log;
a vehicle state extractor that extracts a vehicle state from the obtained vehicle log;
difference generation log storage that stores a list of difference generation logs, each difference generation log being a vehicle log for each of vehicle states shared between the vehicle log transmission device and the vehicle log analysis server;
a difference generation log selector that selects a difference generation log from the list in accordance with the extracted vehicle state;
a difference log generator that generates a difference log based on the obtained vehicle log and the selected difference generation log; and
a difference log transmitter that transmits, to the vehicle log analysis server, the generated difference log and a difference generation log identifier corresponding to the selected difference generation log, and
the vehicle log analysis server includes:

a difference log receiver that receives the difference log and the difference generation log identifier transmitted from the difference log transmitter;
restoration log storage that stores the list; and
a vehicle log restorer that specifies the difference generation log used to generate the difference log from the difference generation log identifier and the list, and restores the vehicle log based on the difference log and the specified difference generation log.

10. The vehicle log analysis system according to claim 9, wherein the difference generation log storage and the restoration log storage store the list of the difference generation logs in which a vehicle log previously transmitted to the vehicle log analysis server is associated with a vehicle state at a time of the transmitting.

11. The vehicle log analysis system according to claim 9, wherein the vehicle log includes a plurality of pieces of data respectively associated with an ID indicating a data type,
the difference generation log storage and the restoration log storage store the list of difference generation logs both for each of IDs included in the vehicle log and each of vehicle states,
the difference generation log selector selects the difference generation log for each ID from the list in accordance with the extracted vehicle state,
the difference log generator generates the difference log for each ID included in the vehicle log that has been obtained, based on data associated with the ID and the selected difference generation log corresponding to the ID, and
the vehicle log restorer restores the vehicle log for each ID included in the difference log, based on data associated with the ID and the specified difference generation log corresponding to the ID.

12. The vehicle log analysis system according to claim 9, wherein the vehicle log includes a plurality of pieces of data respectively associated with IDs indicating a data type, the plurality of pieces of data being arranged in such a manner that a plurality of IDs starting with a predetermined ID repeat in a cyclical manner,
the difference generation log selector selects the difference generation log corresponding to a plurality of IDs starting with the predetermined ID from the list in accordance with the extracted vehicle state, and
the vehicle log restorer specifies the difference generation logs corresponding to a plurality of IDs starting from the predetermined ID, and restores the vehicle log based on the difference log and the specified difference generation log.

13. The vehicle log analysis system according to claim 9, wherein the difference generation log storage and the restoration log storage store the list of the difference generation logs which have been subjected to replacement processing for replacing a value of data with a predetermined value or rounding processing for rounding a value of data, and
the difference log generator further generates the difference log after subjecting the obtained vehicle log to the replacement processing or the rounding processing.

14. The vehicle log analysis system according to claim 9, wherein the vehicle log includes a plurality of pieces of data respectively associated with time information,
the difference generation log storage and the restoration log storage store the list of the difference generation logs in which the time information has been replaced with index information,
the difference log generator further generates the difference log after replacing the time information included in the obtained vehicle log with the index information,
the difference log transmitter further transmits, to the vehicle log analysis server, a time list expressing a correspondence relationship between the time information and the index information, and
the vehicle log restorer further restores the vehicle log by referring to the transmitted time list and replacing the index information with the time information.

15. The vehicle log analysis system according to claim 14, wherein the vehicle log includes the plurality of pieces of data respectively associated with IDs indicating a data type,
the difference generation log storage and the restoration log storage store the list of the difference generation logs sorted by a magnitude of a value of the ID, with difference generation logs having the same ID being sorted by data size,
the difference log generator further generates the difference log after replacing the time information with index information for the obtained vehicle log and sorting the difference generation logs by the magnitude of the value of the ID, with difference generation logs having the same ID being sorted by data size, and
the vehicle log restorer further restores the vehicle log by referring to the transmitted time list, replacing the index information with the time information, and sorting the vehicle log in order from the earliest time.

16. The vehicle log analysis system according to claim 9, wherein the difference log generator uses the selected difference generation log as a data compression dictionary, compresses the obtained vehicle log according to a predetermined compression algorithm, and generates the compressed vehicle log as the difference log, and
the vehicle log restorer restores the vehicle log by using the specified difference generation log as a data compression dictionary and decompressing the difference log according to the predetermined compression algorithm.

17. The vehicle log analysis system according to claim 9, wherein the vehicle state extractor extracts at least one of a vehicle speed, a driving assistance mode, an autonomous driving mode, a travel location, weather, or temperature, included in the vehicle log, as the vehicle state.

18. The vehicle log analysis system according to claim 9, wherein the vehicle log obtainer obtains, as the vehicle log, at least one of the following: an in-vehicle network log according to the CAN or CAN-FD protocol, the in-vehicle network log including a frame ID as the ID of the vehicle log; an in-vehicle network log according to the FlexRay (registered trademark) protocol, the in-vehicle network log including a slot ID as the ID of the vehicle log; an in-vehicle network log according to the Ethernet (registered trademark) protocol, the in-vehicle network log including an IP address as the ID of the vehicle log; and a system operation log including a process number as the ID of the vehicle log.

19. The vehicle log analysis system according to claim 9, wherein the vehicle log analysis server further includes:
an anomalous log detector that monitors the restored vehicle log and detects a case where the restored vehicle log contains evidence of an attack as an anomaly; and an anomaly notifier that notifies a predetermined notification target.

20. A vehicle log transmission/reception method comprising:
- a vehicle log transmitting method performed by a vehicle log transmission device; and
- a vehicle log receiving method performed by a vehicle log analysis server,
- wherein the vehicle log transmission/reception method transmits a vehicle log from the vehicle log transmission device to the vehicle log analysis server,
- the vehicle log transmission device includes difference generation log storage that stores a list of difference generation logs, each difference generation log being a vehicle log for each of vehicle states shared between the vehicle log transmission device and the vehicle log analysis server,
- the vehicle log analysis server includes restoration log storage that stores the list,
- the vehicle log transmitting method includes:
- obtaining the vehicle log;
- extracting a vehicle state from the obtained vehicle log;
- selecting a difference generation log from the list in accordance with the extracted vehicle state;
- generating a difference log based on the obtained vehicle log and the selected difference generation log; and
- transmitting, to the vehicle log analysis server, the generated difference log and a difference generation log identifier corresponding to the selected difference generation log, and the vehicle log receiving method includes:
- receiving the difference log and the difference generation log identifier transmitted in the transmitting; and
- specifying the difference generation log used to generate the difference log from the difference generation log identifier and the list, and restoring the vehicle log based on the difference log and the specified difference generation log.

21. A vehicle log transmission method used by a vehicle log transmission device that transmits a vehicle log to a vehicle log analysis server, the vehicle log transmission method comprising:
- obtaining the vehicle log;
- extracting a vehicle state from the obtained vehicle log;
- storing a list of difference generation logs, each difference generation log being a vehicle log for each of vehicle states shared between the vehicle log transmission device and the vehicle log analysis server;
- selecting a difference generation log from the list in accordance with the extracted vehicle state;
- generating a difference log based on the obtained vehicle log and the selected difference generation log; and
- transmitting, to the vehicle log analysis server, the generated difference log and a difference generation log identifier corresponding to the selected difference generation log.

* * * * *